United States Patent [19]

Cole

[11] Patent Number: 4,852,144
[45] Date of Patent: Jul. 25, 1989

[54] TRAFFIC GENERATOR ANALOG

[76] Inventor: Marion P. Cole, 10732 Dunhill Terr., Raleigh, N.C. 27615

[21] Appl. No.: 199,900

[22] Filed: May 24, 1988

Related U.S. Application Data

[63] Continuation of Ser. No. 115,632, Oct. 26, 1987, abandoned, which is a continuation of Ser. No. 808,639, Dec. 13, 1985, abandoned.

[51] Int. Cl.[4] ............................................. H04M 3/26
[52] U.S. Cl. ........................................ 379/11; 379/22; 379/16; 379/10
[58] Field of Search ........................ 379/11, 10, 22, 16

[56] References Cited

U.S. PATENT DOCUMENTS

| 3,239,612 | 3/1966 | McAllister | 179/175.2 |
| 3,497,639 | 2/1970 | Malinich et al. | 179/175.2 |
| 3,515,820 | 6/1970 | Bereznak | 179/175.2 |
| 3,692,961 | 9/1972 | Le Strat et al. | 179/175.2 |
| 3,692,962 | 9/1972 | Raczynski et al. | 179/175.2 |
| 3,700,830 | 10/1972 | Naylor et al. | 179/175.2 |
| 4,021,624 | 5/1977 | Kelly et al. | 179/175.2 D |
| 4,255,625 | 3/1981 | Walton et al. | 179/175.2 D |

OTHER PUBLICATIONS

Mascot, Call Simulator for Digital Switching System, ITT Network 2000, 9/81/5m, 6 pages.
Simulator d'appels locaux, W. Johner, La Revue Polytechnique No. 1416 9/81 pp. 1319-1323.

Primary Examiner—Stafford D. Schreyer

[57] ABSTRACT

A call processing monitor method and apparatus for dynamically verifying the operation of a telephone switching center having a plurality of originating lines and a plurality of terminating lines. This verification is accomplished by a telephone line pair being randomly selected and tested for the basic telephone functions. In particular, the line pair is monitored for sending and receiving a test tone in both call directions through the switching center.

38 Claims, 19 Drawing Sheets

1

TRAFFIC GENERATOR ANALOG

CROSS REFERENCE TO RELATED APPLICATIONS

This is a continuation of co-pending Ser. No. 115,632, filed on Oct. 26, 1987 abandoned, which is a continuation of abandoned Ser. No. 808,639, filed on Dec. 13, 1985 abandoned.

MICROFICHE APPENDIX

This application contains a microfiche appendix consisting of two (2) fiche and a total of one hundred twenty-eight (128) frames.

FIELD AND BACKGROUND OF THE INVENTION

This invention relates generally to testing equipment for a telecommunications switch, and more particularly to a call processing monitor system which generates and analyzes the functions of a telephone call for determining if the switch is operating properly.

Testing the operability of telecommunications switches is necessary and is a common practice in the industry. If all the functions of a switch are not analyzed, especially before the switch is installed in the telecommunications network, an inherent problem in the hardware or software of the switch can go unrecognized until it fails in actual use. As a result, many telephone susbscribers could be unnecessarily out-of-service for an extended period of time. This problem can be resolved by troubleshooting or testing the hardware and software of the switch itself during its installation in the telecommunications switching network or during its repair period.

There are basically two types of telecommunication switches available—analog and digital. Analog switches have been around a long time and are characterized as having the same path connected through it for the voice channels of the originating and terminating lines of a telephone call. On the other hand, digital switches have recently came about with the advent of the computer age and are characterized by using state-of-the-art techniques to enhance their efficiency and reduce their size. Typically, the voice channels for the originating and terminating lines of a telephone call through this type of switch follow different paths. This is because digital switches employ multiplexers and other high technology telecommunication transmission devices to allow many different voice channels to be carried over a single transmission line.

Several arrangement for testing of telecommuniations switches are known from previous work. For example, U.S. Pat. No. 4,255,625 discloses a call processing monitor system which verifies the operation of a telephone switching center. This particular verification is basically accomplished by the monitor system sending a test tone at a specific frequency only from the terminating side to the originating side of a selected telephone line pair, as is the common practice for the one voice channel path of analog switches. If this transmitted test tone is received by the assigned originating line for the simulated telephone call after traveling through the switching center, it is assumed that a successful call has been made and this indication is duly noted.

Other testing arrangements similar to U.S. Patent No. 4,255,625 are disclosed in the following prior art publications: (a) *MASCOT Call Simulator for Digital Switching Systems—ITT Network* 2000 (September 1981), and (b) *Simulateur d'appels locaux*, W. Johner, La Revue Polytechnique No. 1416: pgs. 1319-23 (September 1981). Even though these prior art testing arrangements could conceivably be used on either an analog or a digital switch, the testing technique for each is still limited to the analog switch situation—verifying only the one voice channel path. Thus, for the digital switch situation, its functions are not thoroughly tested by the prior art test sets. Specifically, the prior testing arrangements have failed to consider that in digital switches both the originating to terminating path (O-T) and the terminating to originating path (T-O) should be verified for ensuring the operability of the switch.

Additionally, in the past, none of the switches were examined for noise above a predetermined level in an assigned voice channel path (i.e. terminating to originating lines and originating to terminating lines for a call). With the tremendous recent increase in the reliance upon telephone switching systems for data communications as well as voice, a "quiet test" of this sort would be helpful in determining if the selected telephone line is in compliance with the threshold noise level required for data transmission. Accordingly, this aspect of the operability of the digital or analog switches has not fully tested by the prior art test sets as today's telephony system requires.

With the foregoing in mind, it is a primary object of the present invention to provide an improved testing method and apparatus which is designed to test the important major functions of a digital switch.

More specifically, it is an important object of this invention to provide an improved testing method and apparatus for verifying multiple voice channel paths, and, more particularly, sending a test tone on the terminating and originating lines and detecting its receipt on the rspective originating and terminating lines.

It is a further and more specific object of the present invention to provide a quiet test for the multiple voice channel paths through the telecommunications switch so that noise above a predetermined level can be detected from its terminating to originating lines and also from the originating to terminating lines.

SUMMARY OF THE INVENTION

These and other objects and advantages of the present invention are achieved by the traffic generator analog apparatus and method hereinafter more fully described.

The call processing monitor system of the present invention dynamically verifies the operation of a telephone switching center having a plurality of originating lines and a plurality of terminating lines. The monitor system comprises a means for selecting one of the originating lines, a dial tone detection means for the selected originating line, a dialing means, a ring detection means on a correspondingly connected terminating line, an answer means for this terminating line, a test tone generation means, a test tone connection means for both originating and terminating lines, and a test tone detection means for both originating and terminating lines.

In accordance with one aspect of the present invention, the call processing monitor system further includes a quiet test means. This quiet test means detects noise above a predetermined level on the originating line and on the terminating line of the switching center when the test tone is not connected thereto.

In accordance with another aspect of the present invention, the call processing monitor system is constructed so as to be capable of simultaneously analyzing in each direction selected pairs of originating and terminating lines which are connected through the switching center. To this end, the call processing monitor system includes a primary processor and a plurality of independently operable secondary processors connected to the primary processor.

The present invention, in still another aspect, provides a method of dynamically verifying the operation of the switching center by selecting an originating line, dialing a telephone directory number digit string, detecting a ringing generator on the appropriately connected terminating line, answering the terminating line, generating a test tone, connecting the test tone to both the terminating and originating lines, and detecting the test tone on both the terminating and originating lines. It is by this method that the operation of the switching center is verified, and, more particularly, both assigned voice paths are tested for their ability to handle a test tone.

The present invention, in still a further aspect, provides a method of dynamically verifying the operation of the switching center by detecting noise above a predetermined level on both terminating and originating lines when the test tone is not connected thereto.

BRIEF DESCRIPTION OF THE DRAWINGS

Some of the features and advantages of the invention having been stated, others will appear as the description proceeds, when taken in connection with the accompanying drawings, in which:

FIG. 19 is a perspective view of the keypad for the traffic generator analog.

DETAILED DESCRIPTION OF THE INVENTION

While the present invention will be described hereinafter with particular reference to the accompanying drawings, it is to be understood at the outset of this description that persons skilled in the applicable arts will be able to modify the specific arrangements here described and shown while continuing to achieve the desired result of this invention. Accordingly, the description and illustrations are to be taken as braod, teaching disclosures directed to persons skilled in the appropriate arts, and not as restricting the scope of the present invention.

Figure 1:
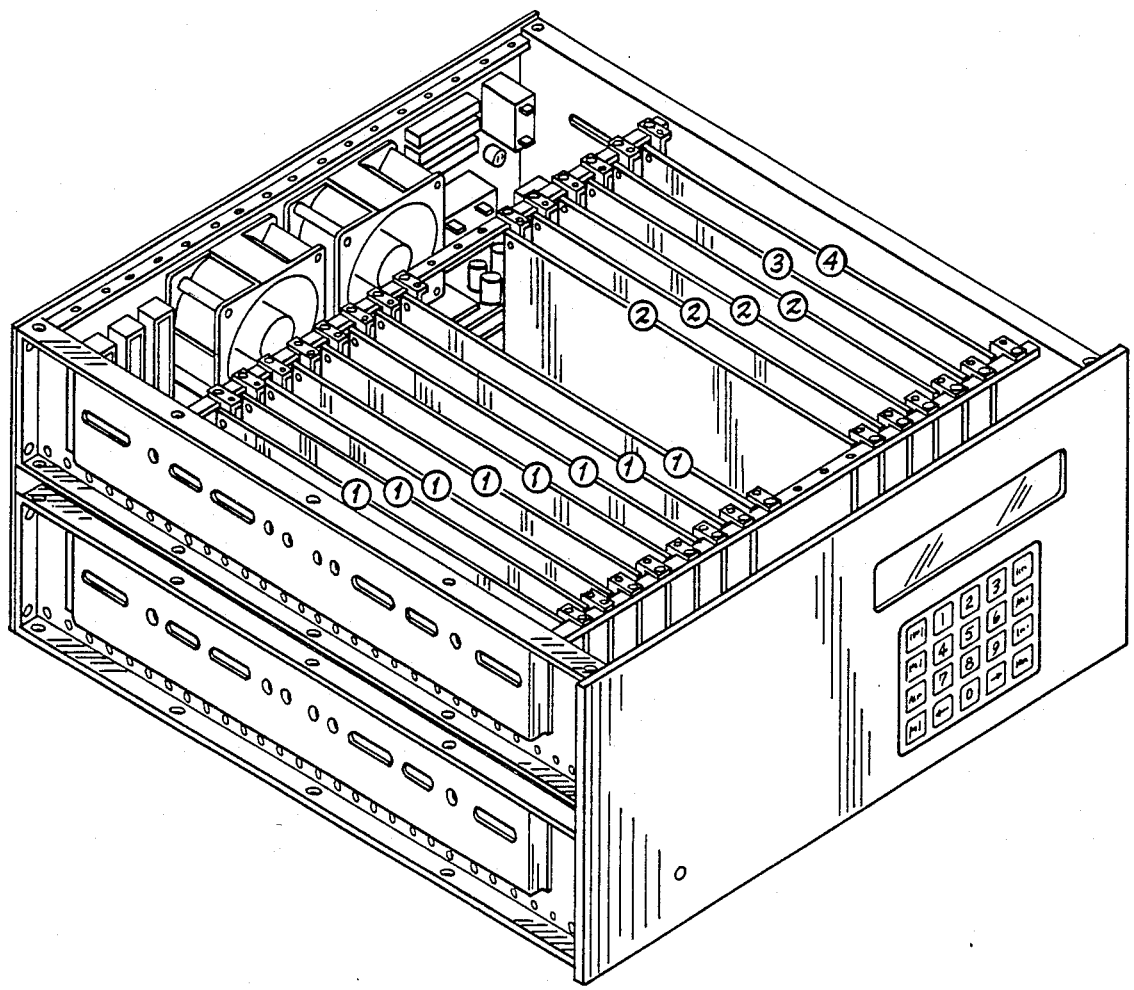
FIG. 1 is a perspective view of the traffic generator analog or the call processing monitor system in accordance with the present invention.

The Traffic Generator Analog ("TGA"), as shown in FIG. 1, is used to generate telephone calls for the purpose of testing the ability of telecommunications central office equipment to properly process phone calls. The Traffic Generator Analog (TGA) is capable of originating calls on forty-eight lines and terminating calls to forty-eight different lines. The TGA has the capability to hook upon ninety-six total lines with originate only on forty-eight lines and terminate only on the remaining forty-eight lines. As part of the test process, the TGA sends path verification tones in both directions and also performs a quiet test in both directions. These features, which do not exist on prior art test equipment, provide a more comprehensive test on four wire digital switching systems.

The TGA is a microprocessor driven call generator and uses EEPROM and EPROM memory for operating programs. This allows for a significant size reduction over systems using disk drives for operating programs and has allowed the packaging of the TGA into a container $8'' \times 16'' \times 21''$ weighing 39 pounds. This provides high portability for the unit and meets the airline standards for carry-on baggage. The TGA makes use of ribbon connectors to interconnect circuit boards rather than backplanes. This prevents the loose connection problem associated with backplanes when subjected to rough physical handling.

Programming of the TGA can be done remotely via a dial up connection to the internal modem. This allows a central location to have the ability to develop and remotely modify programs for the TGA and then dump these programs into the TGA from anywhere in the world. The TGA also incorporates an internal keypad (see FIG. 19) and forty character Liquid Crystal Display (LCD) to allow the user to program the TGA or modify an existing program without the need for an external CRT or printer. The LCD is also used to provide operational measurements of the TGA.

Figure 3:
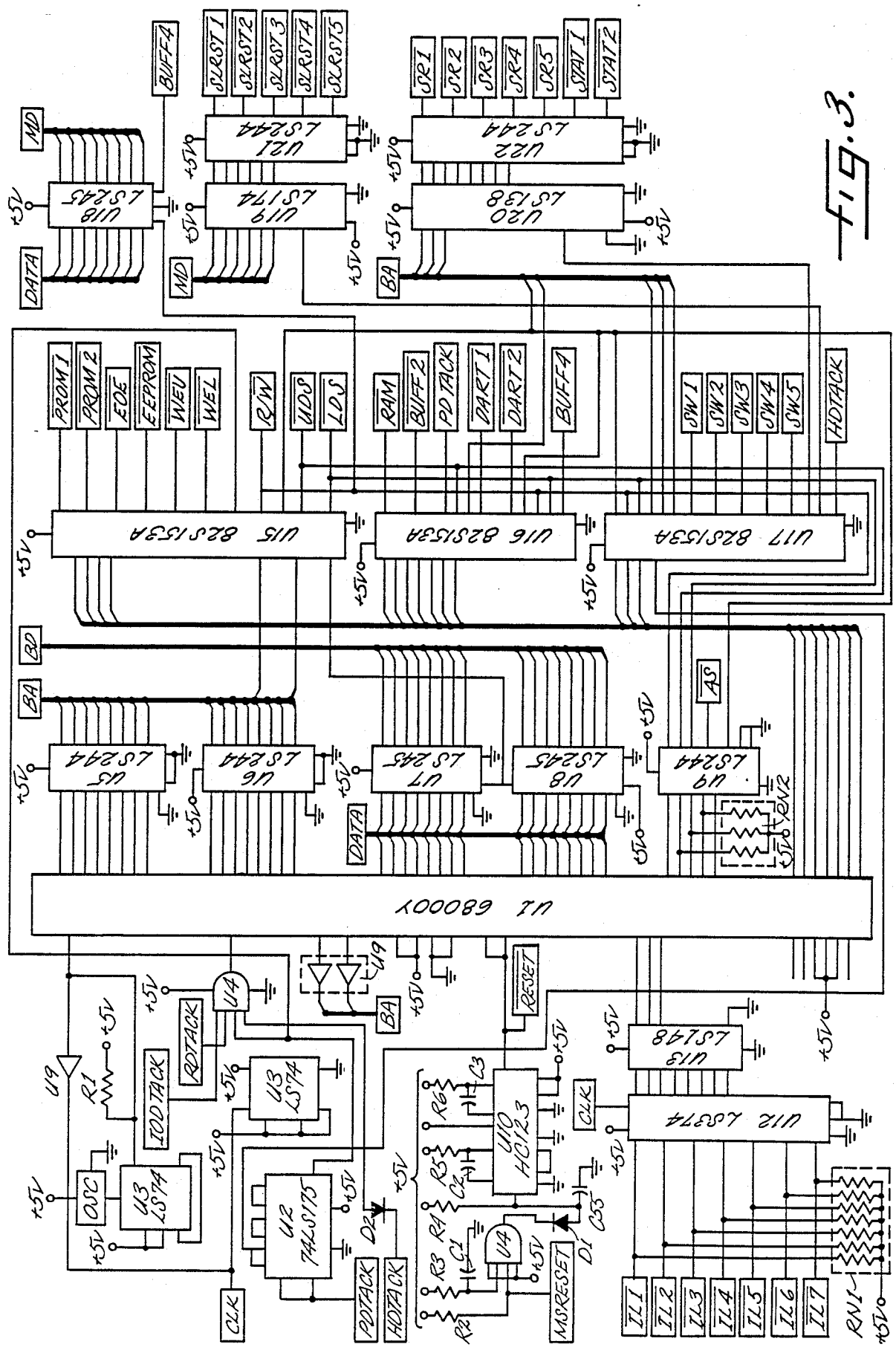
FIGS. 3, 4, and 5 are schematic diagrams of primary processor and its associated circuit components.
Figure 4:
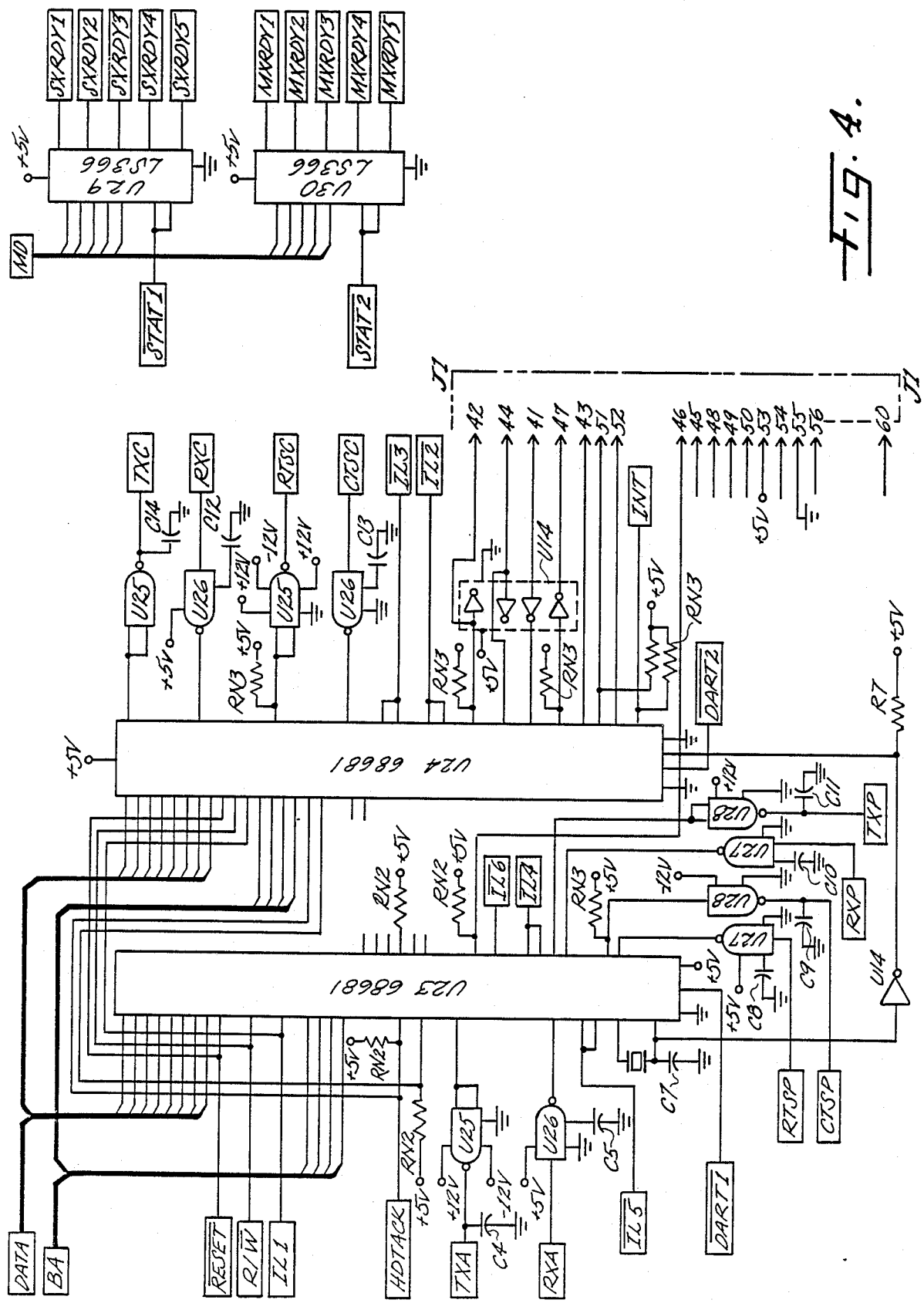
Figure 5:
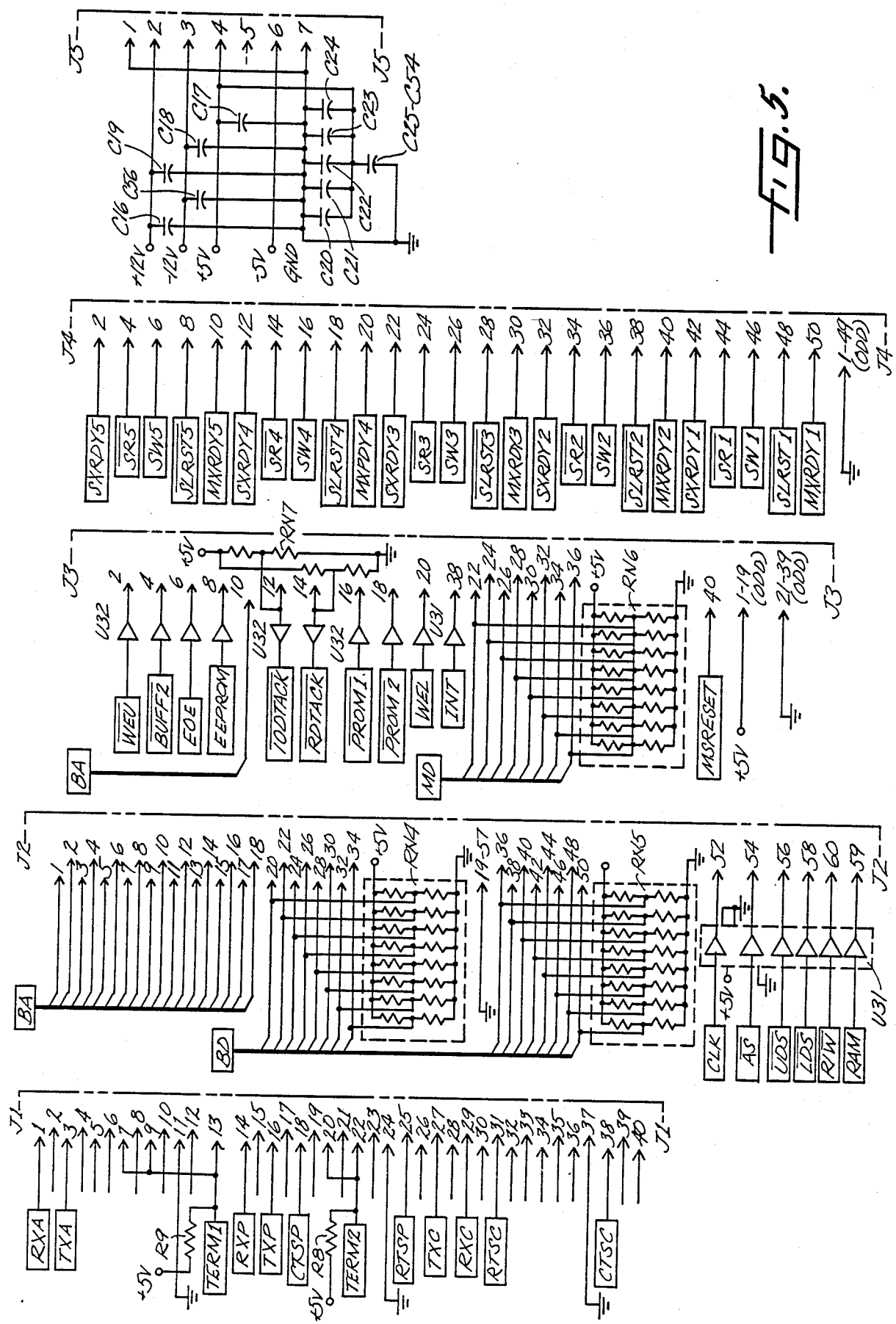
Figure 13:
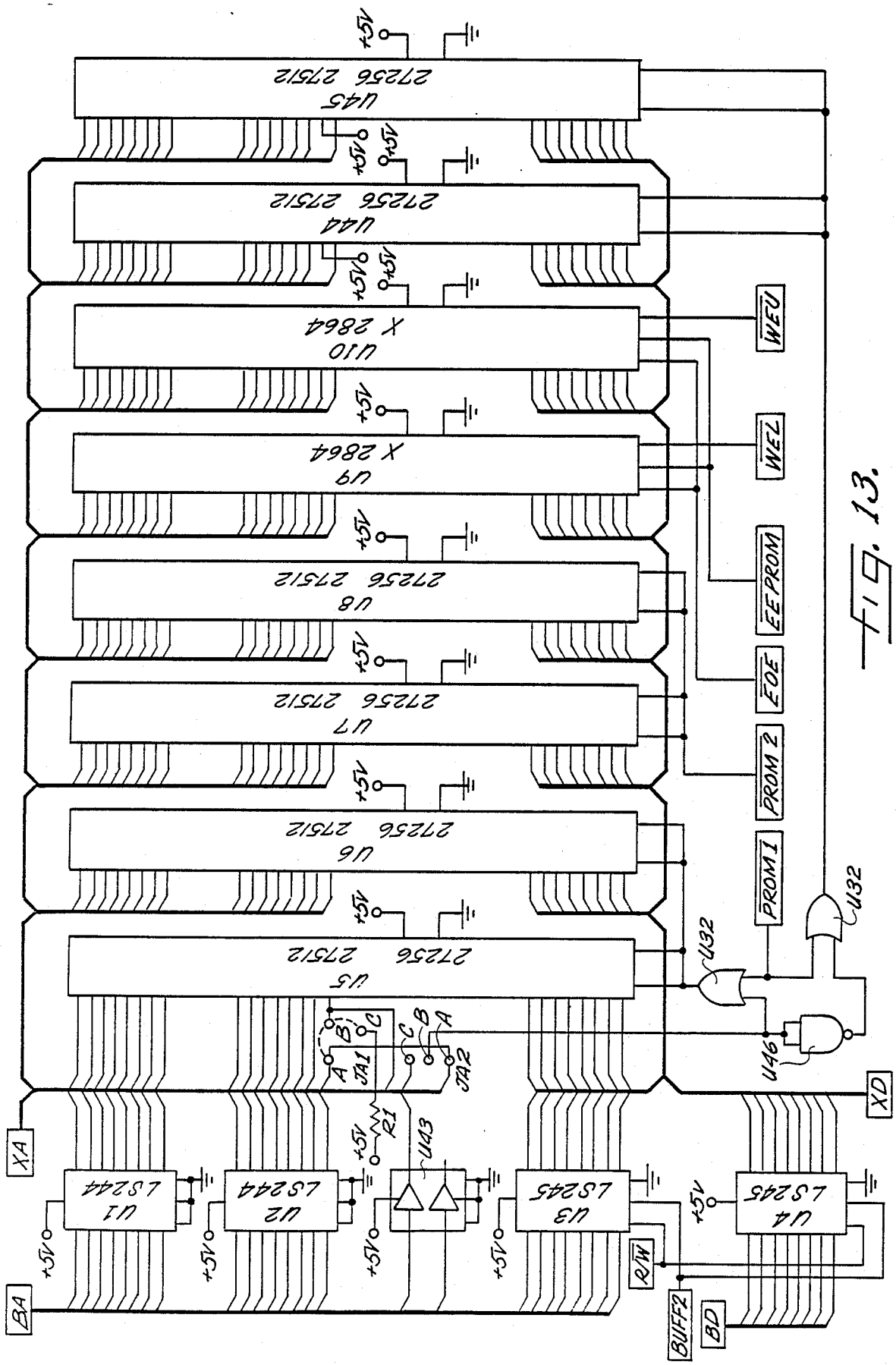
FIGS. 13, 14, and 15 are schematic diagrams of the RAM/ROM memory devices.
Figure 14:
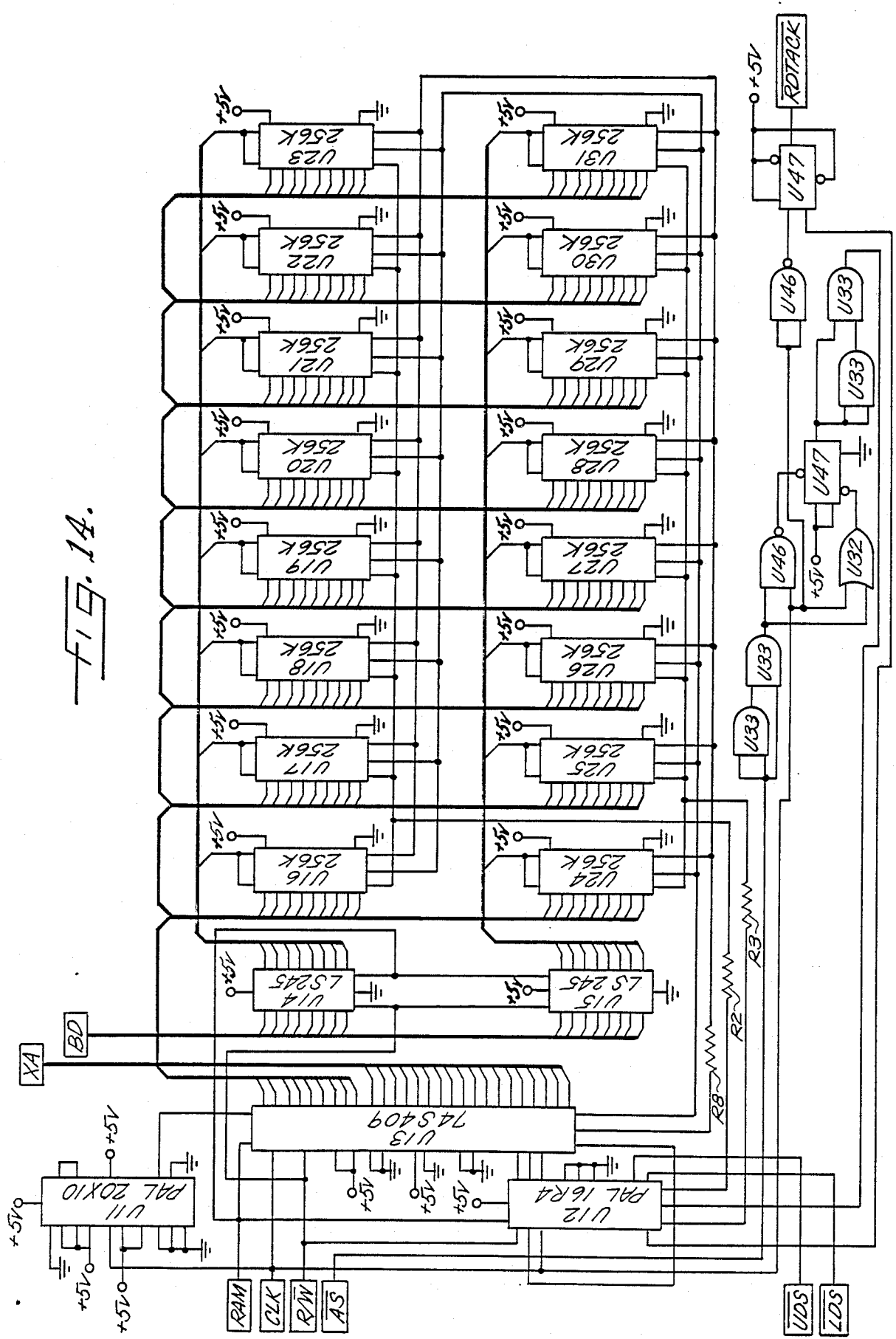
Figure 15:
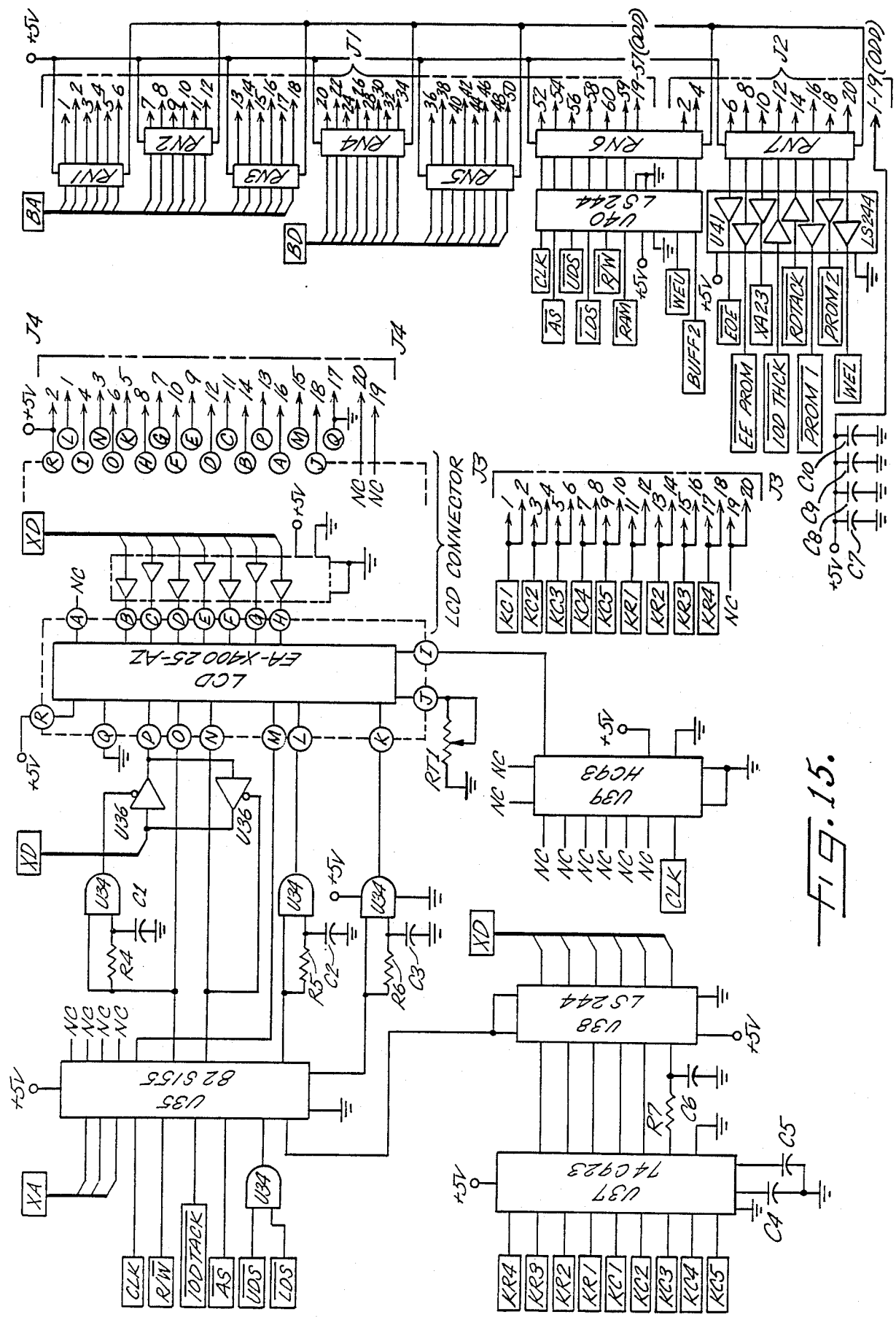
Figure 16:
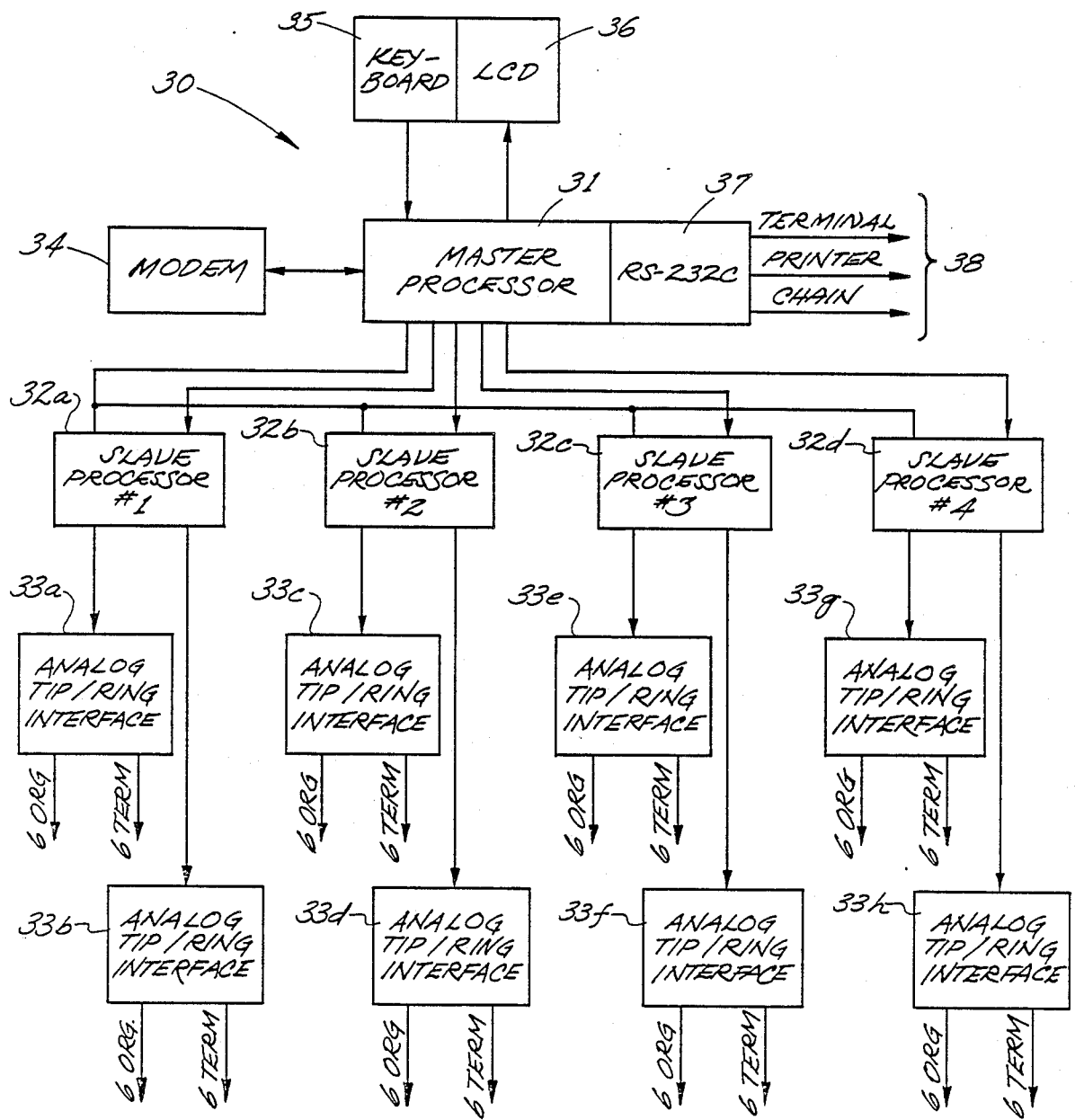
FIG. 16 is a block diagram showing the connections between the primary or master processor, the secondary or slave processors, and the line or analog tip ring interfaces.

The Traffic Generator Analog provides a small, lightweight, programmable call generator with the ability to generate a minimum of ten thousand call attempts per hour. This is achieved by a distributed processor system, as illustrated in FIG. 16. The primary processor handles the administrative tasks of the system, such as keeping track of lines to place calls over, interfacing input from the keypad or external keyboard, interfacing output to the internal forty character LDC or external CRT, messaging to and from an internal or external modem. Referring to FIGS. 3, 4, and 5, the Primary Processor is a 68000 processor based board and with the external RAM/ROM (see FIGS. 13, 14 and 15) has access to 500K of RAM, 378K of EPROM, and 16K of EEPROM.

Figure 6:
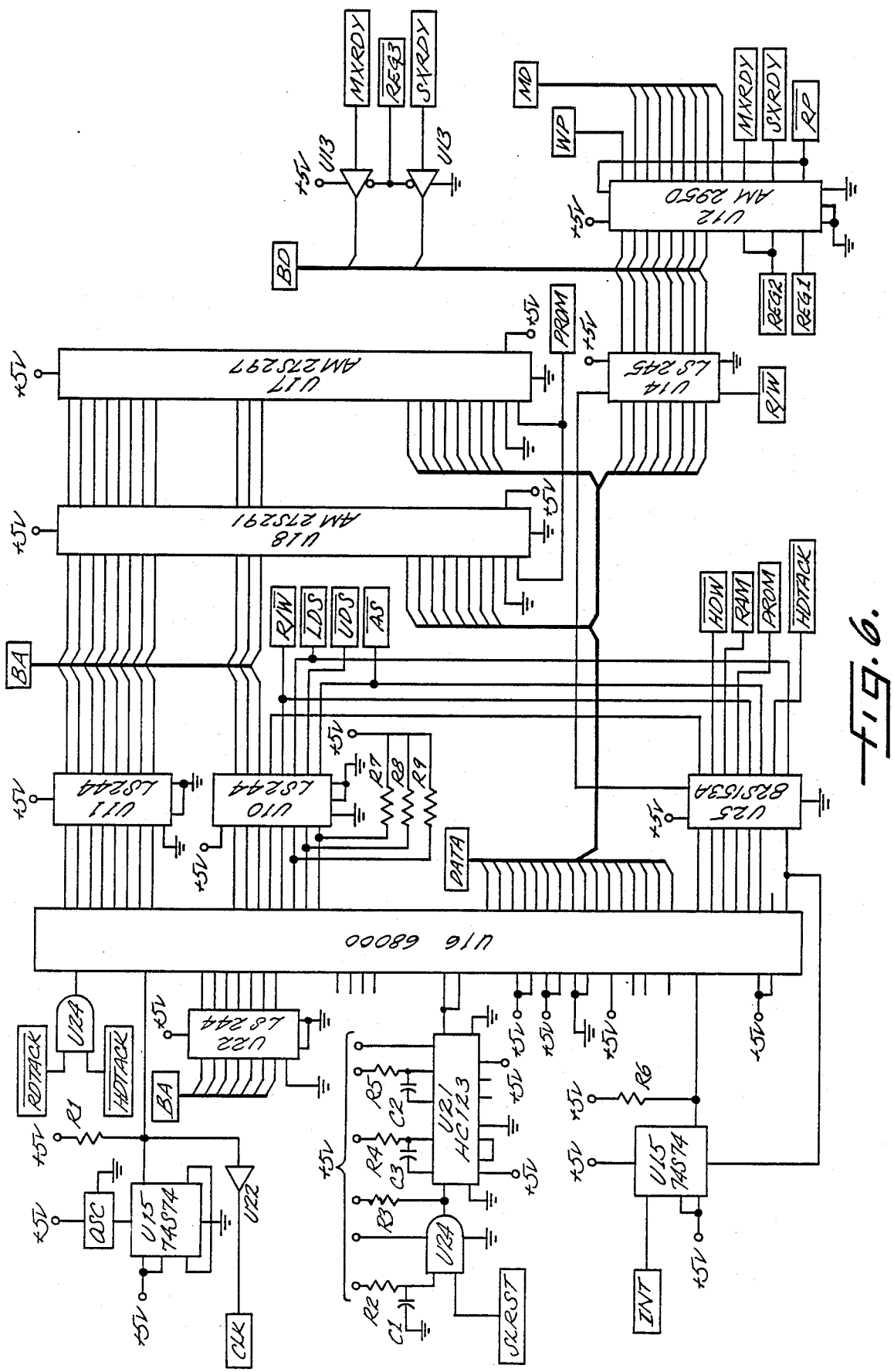
FIGS. 6, 7, and 8 are schematic diagrams of the secondary processors and its associated circuit components.
Figure 7:
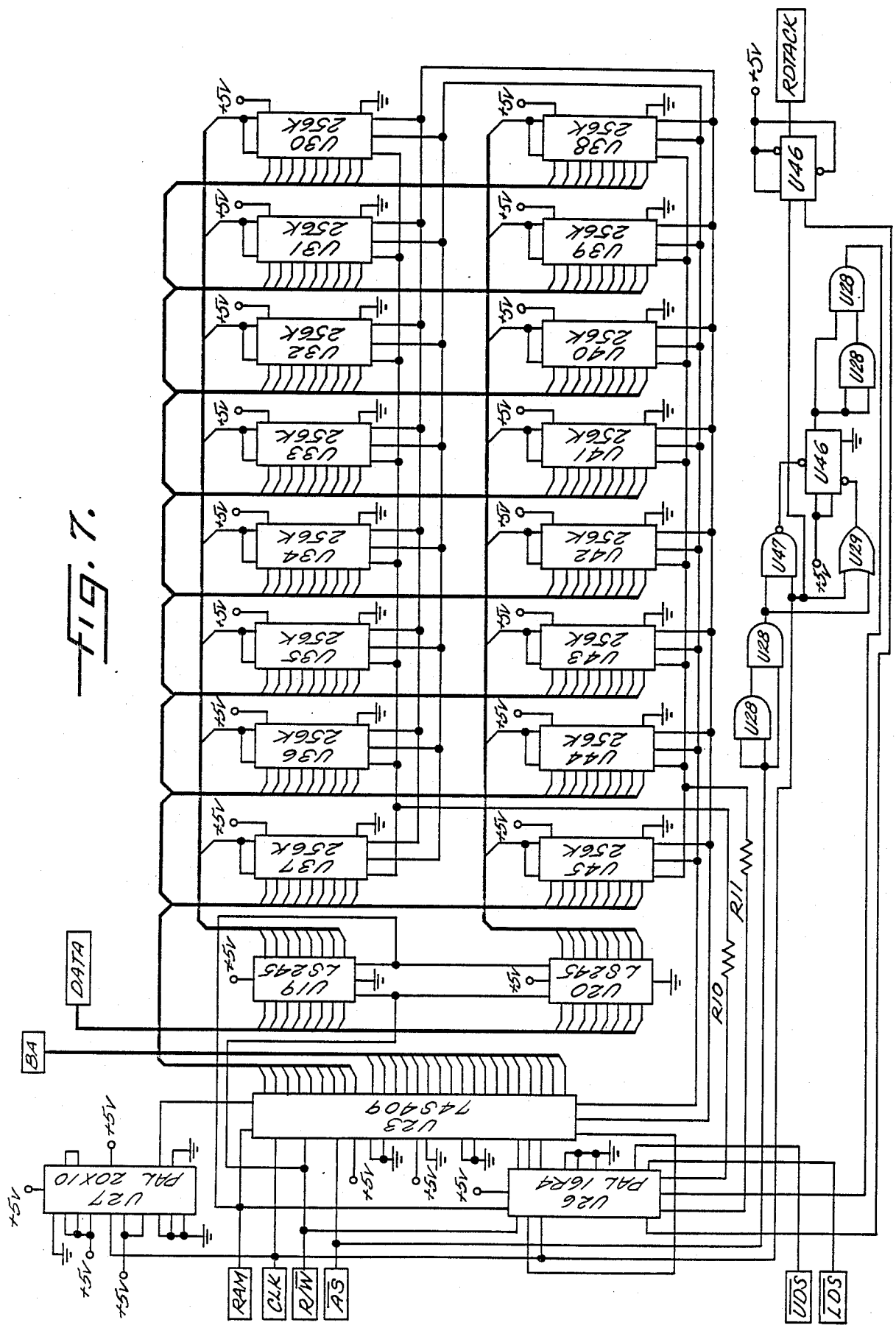
Figure 8A:
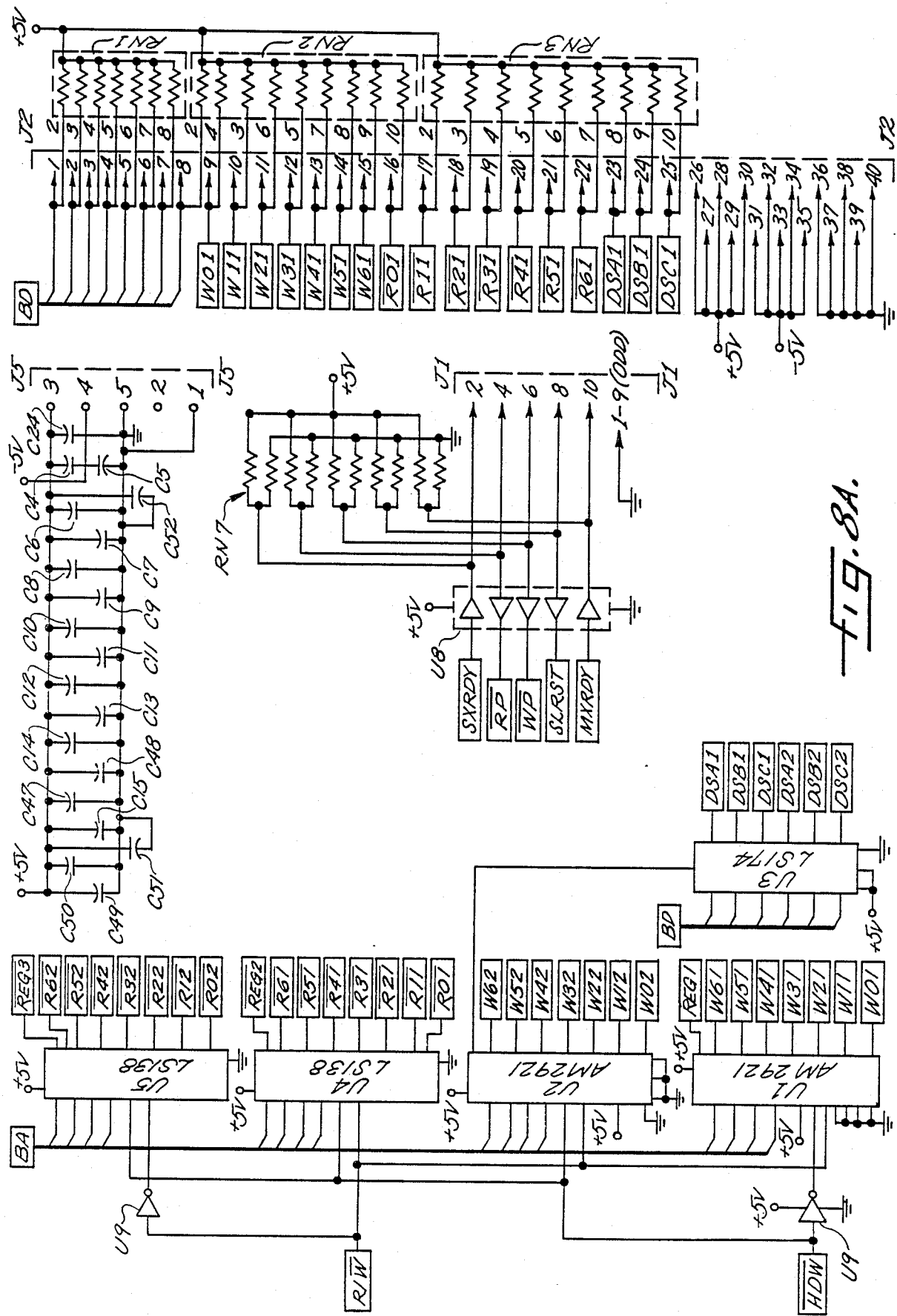
Figure 8B:
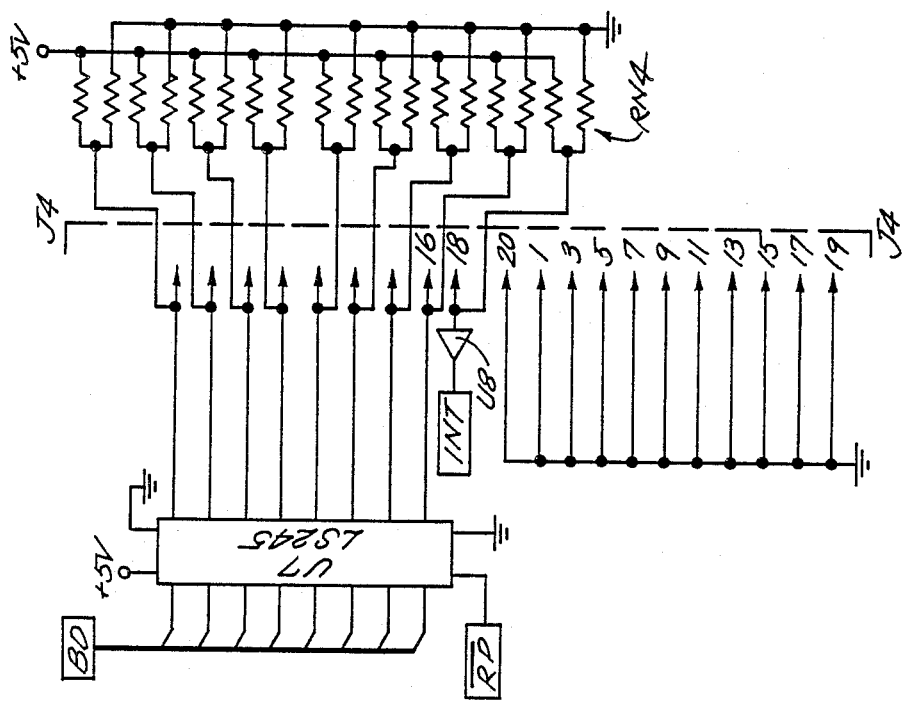
Figure 9:
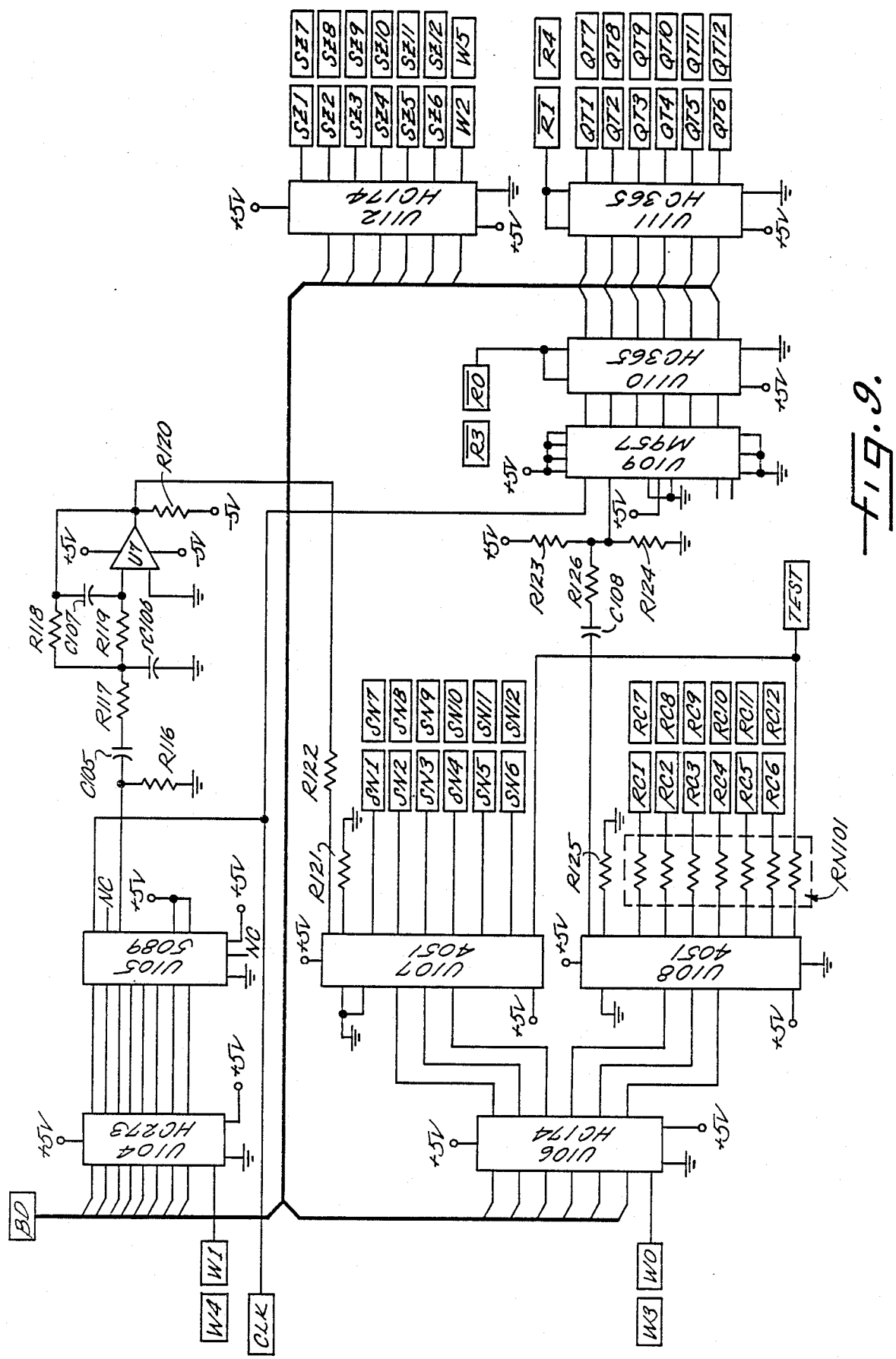
FIGS. 9, 10, 11, and 12 are schematic diagrams of the line interfaces for the originating and terminating lines.
Figure 10:
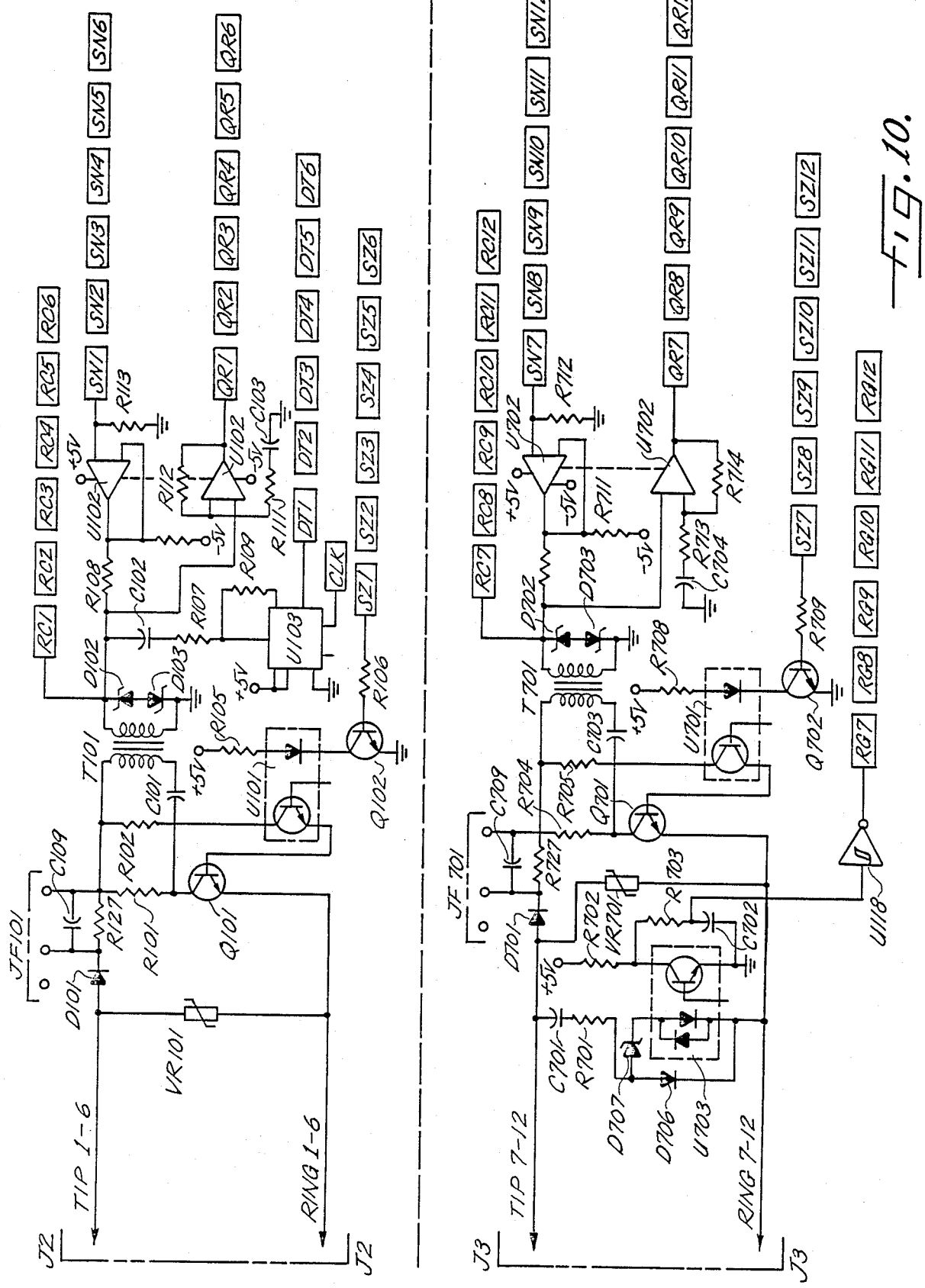
Figure 11:
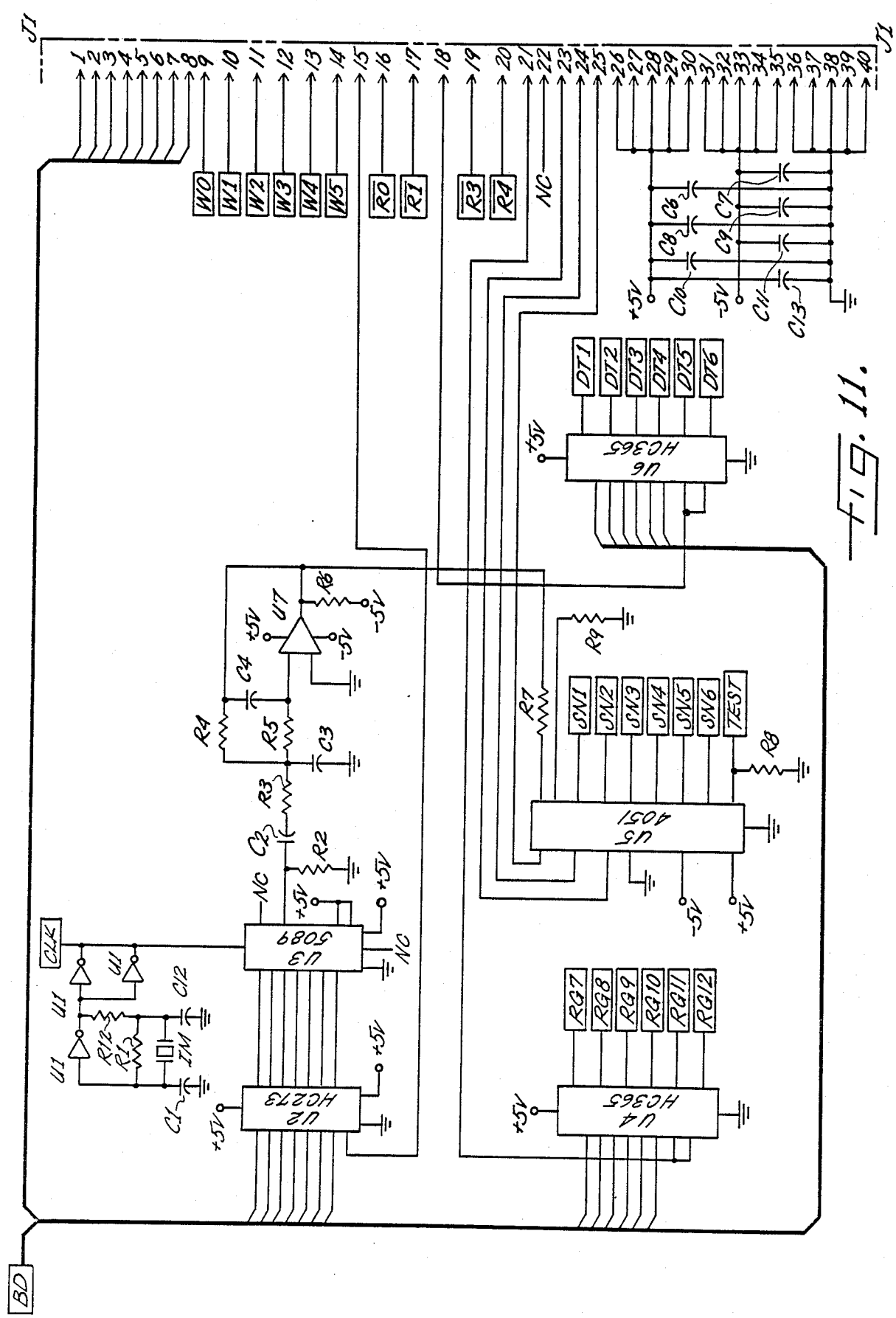
Figure 12:
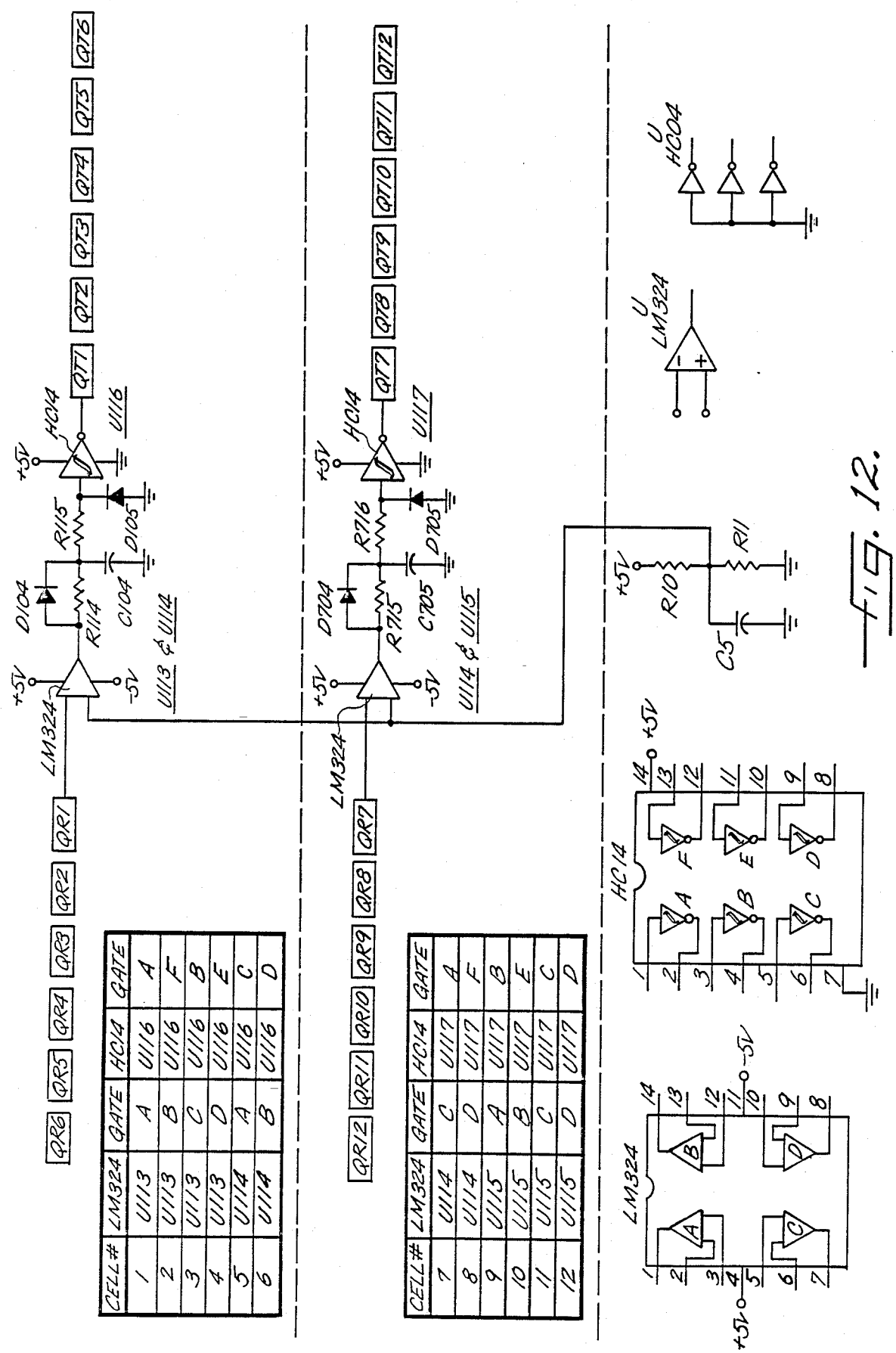

The EPROM and EEPROM associated with the primary processor retains all operating programs and calling programs (see Microfiche appendix) when the TGA is turned off. Upon power up, an image of the operating program and calling parameters for the secondary processors is downloaded, from EPROM and EEPROM to RAM in the secondary processors, illustrated generally in FIG. 16 and more particularly in FIGS. 6, 7, and 8. Once the operating programs are downloaded, the primary processor issues the response "EPROM Checkup Complete" on the LCD. The user then enters "Times of Day" on the keypad to start all processors. Table information is then downloaded from EPROM to the secondary processors. When the tables are downloaded the LCD displays "System Prompt."

Figure 2:
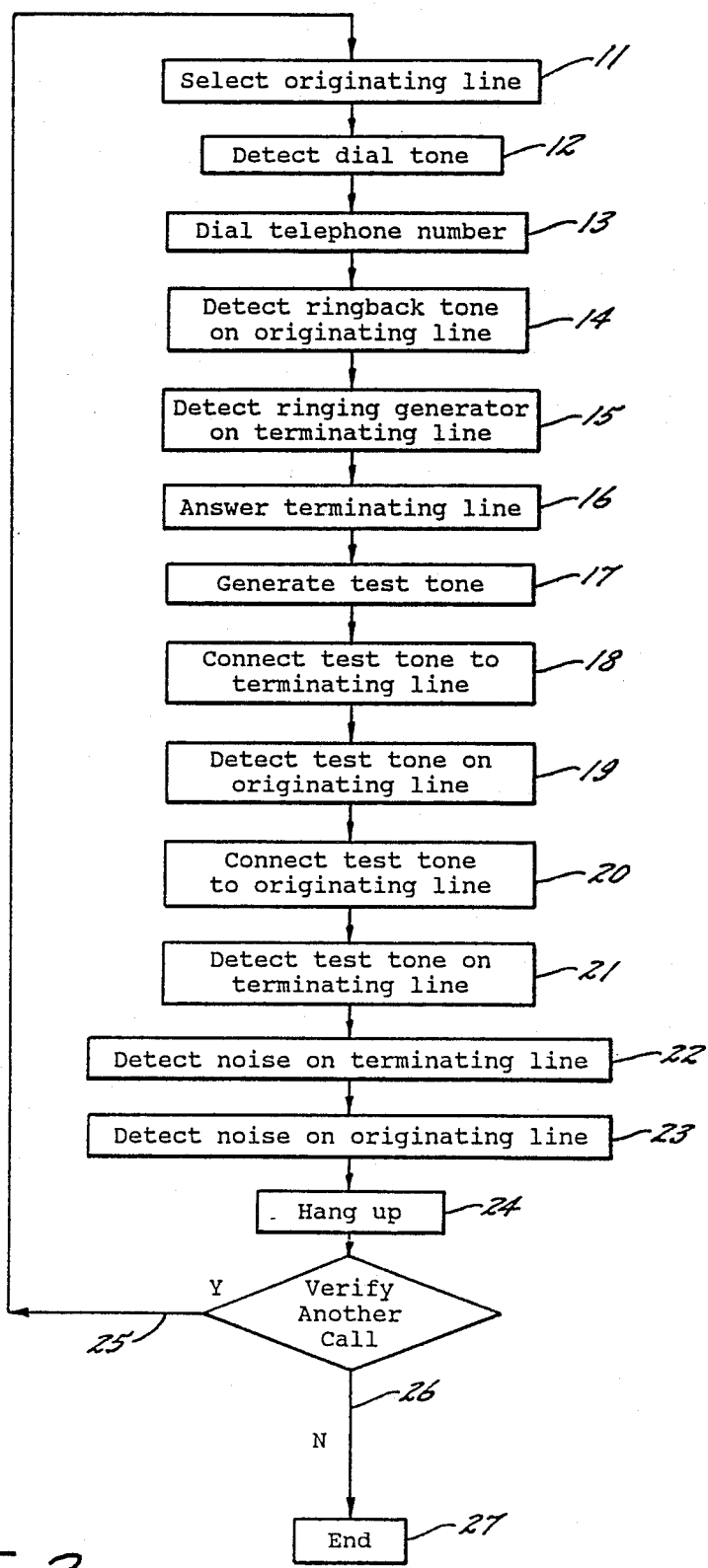
FIG. 2 is a flowchart illustrating the primary functions of the test system of the present invention.

The user then enters "START" to begin generation of calls. The secondary processors run line interface circuit boards (FIGS. 9, 10, 11, and 12) in real time. In the operation of one of the secondary processors, it changes a register value which results in change of state to a hex D flip-flop. The output of which goes over a data bus to enable a transistor switch thereby closing a loop to seize an originating telephone line as shown at 11 in the flowchart of FIG. 2. The line is monitored for a dial tone, as indicated at 12 (FIG. 2), by a Teltone M980 chip. If a 400 to 600 hertz tone is present, the detect chip issues an output via bus driver to the secondary processor. The secondary processor continues executing the task for the line assigned to be served by the primary processor. The secondary processor will now generate the telephone directory number digit string from a table in the task routine, as indicated at 13 (FIG. 2). The dual tone multi-frequencies ("DTMF") and dial pulses ("DP") are generated at any time in the digit string from a 5089 chip via 4051 multiplexer to the assigned line, under control of the secondary processor. During this dialing the originating line is monitored for a dial tone after each DTMF or DP digit. When the dialing is completed and the terminating line is still in an on-hook condition, the end of the dial tone and beginning of the ringback tone is detected on the originating line, as shown at 14 (FIG. 2). A ringing generator is detected, as illustrated at 15 (FIG. 2), on one of the terminating lines. This ringing generator is an ac voltage signal that is sent by the switch for typically ringing a bell on the terminating telephone. It is commonly in the order of 90 to 160 volts and 16-⅔ to 66-⅔ cycles per second. This ringing generator signals that a complete path has been connected through the switch from the originating line to the terminating line. An answer means indicated at 16 (FIG. 2) thus produces an off hook signal on the terminating line. The ringback tone and ringing generator thereby end.

Referring to 17 in FIG. 2, a test tone is now generated at one of a plurality frequencies, such as those corresponding to normal voice or data transmission. The test tone connection means operates in response to the off-hook condition on both the originating and terminating lines and it connects the test tone generation means to the terminating line and the originating line. A test tone detection means is then connected to the originating and the terminating lines. The order that the test tones are connected and detected can vary from one at a time (in either order) to simultaneously. In the preferred embodiment, the test tone is first connected to the terminating line and detected for on the originating line, as shown at 18 and 19 (FIG. 2). Next, the test tone is connected to the originating line and detected for on the terminating line, as illustrated at 20 and 21 (FIG. 2). The test tone detection and connection means are then disconnected so that the test tone generation means ends. Accordingly, a complete path for the assigned line pair has been checked for test tone transmissions each direction through the switch.

The present invention also includes a quiet test for detecting noise, such as would be important in determining if the line pair is in compliance with the threshold noise level required for data transmission. The quiet test can either operate immediately before, concurrent with, or after the above-mentioned tone test. In the preferred embodiment and as shown in FIG. 2, the quiet test follows the tone test. It first detects noise above a predetermined level on the terminating line, as indicated at 22 (FIG. 2), and then detects noise above a predetermined level on the originating line, as indicated at 23 (FIG. 2). Even though the order for the quiet test is set forth, it can operate in either the reverse connection order or simultaneously on both originating and terminating lines.

After completing the tone test and quiet test in both directions through the switch, the originating and terminating lines go to the on-hook condition by a hang-up means, as shown at 24 (FIG. 2), so that the verification of this particularly selected line pair ends. If another call needs to be verified, as illustrated at 25 (FIG. 2), the sequence of the call processing monitor system is repeated so that another line pair can be tested in both directions through the switch. If there is not another call to be verfied, the testing of the call processing monitor system ends, as shown at 26 and 27 (FIG. 2).

FIG. 16 illustrates the hardware for the distributed processing arrangement generally at 30, and more specifically includes a master or primary processor 31 connected to a plurality of independently operable slave or secondary processors 32a to 32d. Each of the secondary processors is connected to analog tip/ring interfaces. For example, secondary processor 32a is connected to analog tip/ring interfaces 33a and 33b; secondary processor 32b is connected to analog tip/ring interfaces 33c and 33d; etc.

The primary processor 31 is connected to a modem 34, a keyboard 35, a liquid crystal display ("LCD") 36, and a RS-232C module 37. The modem 34 allows remote input and output ("I/O") access with the primary processor 31. The keyboard 35 (more specifically shown in FIG. 19) allows the user to provide input to the primary processor 31 while the LCD 36 allows the primary processor 31 to output a display to the user. The RS-232C module 37 enables the primary processor 31 to connect to an external device, such as CRT terminals, printers, other TGAs connected in a chaining arrangement, etc. all as indicated at 38 of FIG. 16. The primary processor 31 is shown in more detail in FIGS. 3, 4, and 5. Additionally, as earlier noted, the primary processor 31 includes the EPROM and EEPROM devices which serve as memory for storage of all needed system and operating programs. The EEPROM allows remote modifiable programming so the TGA can be programmed by a user or through the modem 34.

The secondary processors 32a to 32d each have a set of instructions (see microfiche appendix) which is downloaded from the EPROM and EEPROM of the primary processor 31 for defining the sequence of test operations, as stated previously and specifically shown in FIG. 2. One of the secondary processors 32a to 32d is shown in more detail with its circuit components in FIGS. 6, 7, and 8.

Figure 17:
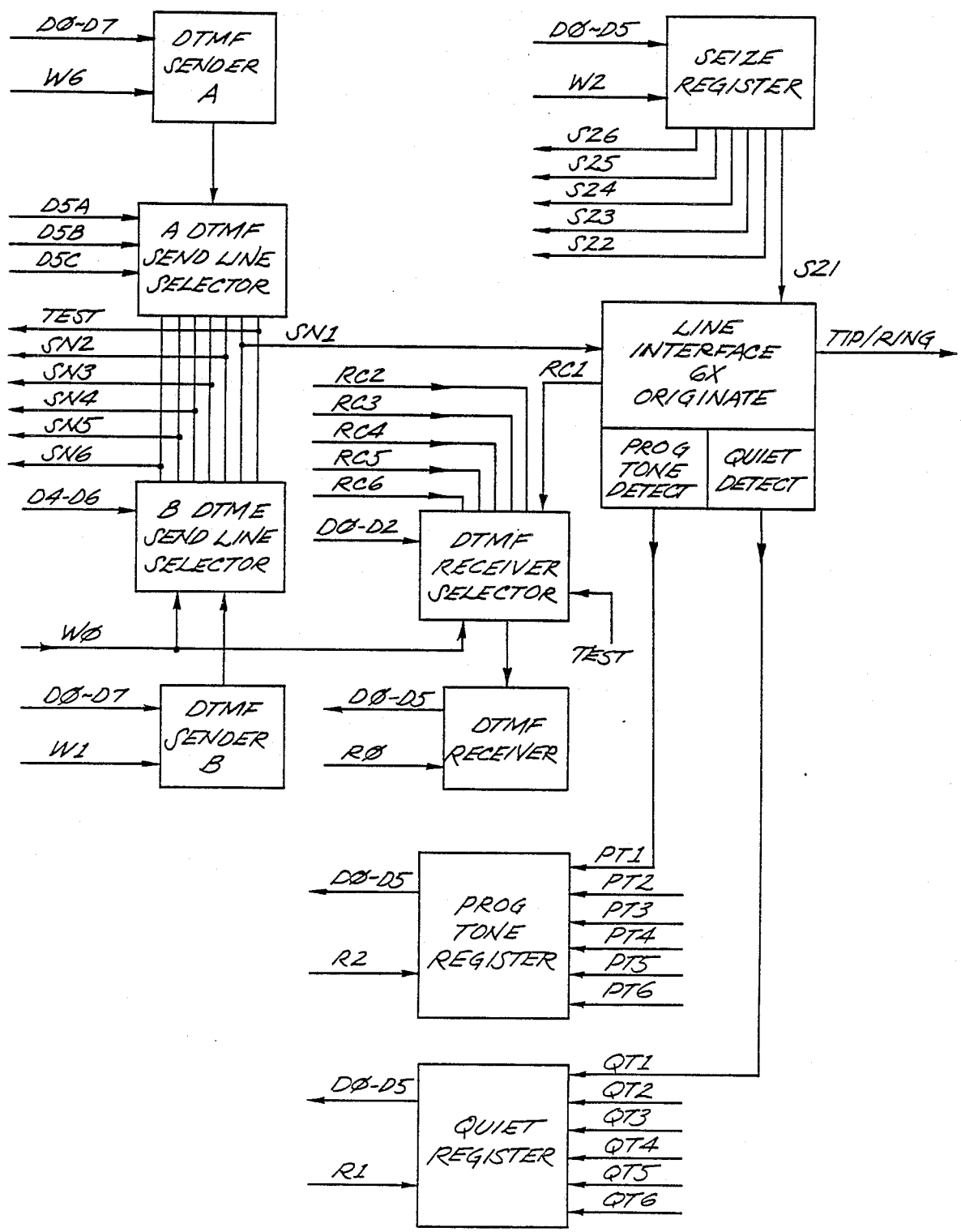
FIG. 17 is a block diagram showing the line interfaces for the originating lines.

As illustrated in FIG. 16, the analog tip/ring interfaces 33a to 33h are first respectively connected to the secondary processors 32a to 32d and are next respectively connected to the originating and terminating lines. More particularly, FIG. 17 displays the line interfaces for the originating lines while FIG. 18 displays the line interfaces for the terminating lines.

As a result of this hardware for the distributed processing arrangement 30 of a TGA, forty-eight line pairs can be selected and verified simultaneously so that approximately ten thousand (10,000) call attempts per hour can be monitored, depending on how the switch is functioning and on how many times the installer is stopping the TGA on a fault to pinpoint a problem (see microfiche appendix).

The call processing monitor system of the present invention also provides means for chaining several TGA units together. This allows a plurality of monitor systems (i.e. TGA's) to be connected together so that an increased number of originating and terminating lines can be simultaneously analyzed through the switching center. Consequently, the number of call attempts per hour can be increased by this chaining means. In the illustrated embodiment, the RS-232 module 37 (FIG. 16) permits connecting units together in this manner.

In operation, upon power up of the TGA, all programs in EPROM and EEPROM are downloaded from the primary processor to the RAM which the secondary processors can access. This allows the TGA user the capability of starting the generation of telephone calls simply by turning on the TGA, hooking up telephone lines to the TGA, and giving the TGA a START command. The TGA software incorporates sixteen levels of securtiy, thereby preventing users access to programming levels which they are not authorized to change.

The system is capable of generating call traffic without requiring the use of external devices such as disk drives, terminals, modems, etc. The operating system is stored in EPROM and can be changed only by replacing the EPROM chips. The operating system controls the basic operation of the system. However, call parameters are stored in programmable EEPROM and may be changed locally or remotely. The following are programmable call parameters:

Number of lines equipped (system parameter)
    Number of lines operational (system parameter)
    Dial tone time-out (originate line parameter)
    Called number (originate line parameter)
    PVT detection time-out (line parameter)
    PVT send time (line parameter)
    Hold on fault condition (line parameter)

These parameters may be changed by connection of a local terminal (CRT/keyboard) or a modem/remote terminal. Once changed, the new parameters are stored in non-volatile memory as the default parameters will be retained if power is removed.

Features.

The Analog Call Generator has the following features:

48 originate and 48 terminate ports
    fully self contained
    4 RS232 Serial I/O ports
    4 cable connections for line access (50 conductor AMP Champ type)
    built-in Primary processor
    one Secondary processor per card of 12 originate and 12 terminate ports
    EPROM memory for operating program
    EEPROM memory for programmable features
    RAM memory for data collection (attempts, failures, etc.)
    Powered by 115 V.A.C.

System Capabilities.

The TGA performs the following functions.
A. Originate:
Seize a line
Recognize dial tone
Outpulse programmed digit string (DTMF or Dial Pulse)
Detect Path Verification Tone (PVT)
Generate PVT (if PVT reception detected)
Perform Quiet Test
Time out after x seconds if no dial tone or PVT is detected and generate a failure peg count
Reset and repeat sequence (programmable stop or fault on a per line basis
B. Terminate:
Recognize ringing
Close the loop to trip ring
Generate PVT for x seconds
Detect originate end PVT (after x seconds)
Perform Quiet Test
Time out after x seconds if no PVT is detected and generate failure record
Reset and repeat sequence An optional 20 button keypad input (FIG. 19) and LCD display output are provided as a front panel I/O device. This feature allows system operation without the need for a local or remote terminal. Simple keypad entries will allow:

display attempts and failures
starting or stopping lines
selecting system parameters Components:
1. Primary Processor
2. (4) Secondary Processors
3. (8) Analog Line Interfaces
4. 300 baud auto-dial/answer modem
5. Cabinet General Description: (FIG. 16)

The TGA is capable of originating and terminating 48 calls on 96 lines. The system is organized with one Primary Processor 31 talking to 4 Secondary Processors 32a-32b, each controlling 2 analog line interfaces with 6 originate lines and 6 termite lines on each. Each Secondary Processor is thereby controlling 12 originate and 12 terminate lines. The Primary Processor is indirectly controlling 48 originate and 48 terminate lines.

Description of Major Components:

The Primary Processor (FIGS. 3, 4, 5) is a 68000 based board set with 512 kbyte of RAM, 128 kbyte of EPROM, 32 kbyte of EEPROM. The Primary Processor has an 8 bit parallel interface to the LCD and Keyboard mounted in the cabinet. Communication is provided by 2 each 68681 dual uarts which interconnect to the following; terminal, printer, modem, and chaining port. Secondary processor communication is provided by an 8 bit parallel interface.

The Secondary Processor (FIGS. 6, 7, 8) is a 68000 based board with 128 kbyte of RAM, 4 kbyte of PROM, (2) parallel interfaces to the analog line interfaces - one for each interface. This interface provides the chip chip selects for all the registers on the line interface, as well as 3 steady state signals. Data is transferred to the line interface registers through an 8 bit bus. Comunications with the Primary Processor is accomplished through an 8 bit bi-directional register. One side of the register is on the Primary processor's data bus, and the other side is on the Secondary processor's data bus. In combination with this are 2 status registers which provide information as to receive character ready and transmit buffer empty.

The Analog Line Interface (FIGS. 9, 10, 11, 12) provides the necessary interface between the Secondary Processor and the tip/ring of the phone line. There are 2 DTMF senders and 1 DTMF receiver available for the 6 originate lines. One DTMF sender and 1 DTMF receiver are available for the 6 terminate lines. Each Originate/Terminate line interface has an integral Quiet line detector. The originate lines have an integral progress tone cadence detector which identifies the progress tone by its temporal pattern. The terminate line interfaces have an integral ring detector.

The Modem is a UDS 1032474 pc data modem. This is F.C.C. registered for direct connect, intelligent auto-dialing, auto-answering full duplex 300 baud modem, DTMF or pulse dialing selectable. A test mode is provided.

The Cabinet (FIG. 1) provides connections for (3) 25 pin female D type connectors for connection of RS232-C peripherals, (4) 25 pair telephone type connectors for connection to lines under test, (1) RJ11 socket for modem connection. The Cabinet has an integral 20 key, keyboard and 40 character ×2 line LCD display.

Block Description of the Line Interface: (FIGS. 9, 10, 11, 12)

A. 6 Originate Lines (FIG. 17) 1. "A" DTMF Sender

This is a standard DTMF sender capable of all 16 valid DTMF digits, and a writable register; nominal send level −15 DBM per frequency. Normal use of this sender will be to dial forward into the switch. Output is fed into the "A" DTMF send Line Selector. The digit sent is selected by the Secondary Processor writing to the register.

2. "A" DTMF Send Line Selector

This is a 1 of 8 output selector and a writable register. The possible selections are originate line interfaces 1 to 6, the test line and an off position. The test line allows interconnection of any DTMF Sender and Receiver on this Line Interface board. The Secondary Processor selects the line to send on by writing to this register.

3. "B" DTMF Sender

This is a standard DTMF sender capable of all 16 valid DTMF digits and a writable register; nominal send level −15 DBM per frequency. Normal use of this sender will be to send forward a digit to identify this line (PVT). Output is fed into the "B" DTMF Send Line Selector. The digit sent is selected by the Secondary processor writing to this register.

4. "B" DTMF Send Line Selector

This is a 1 of 8 output selector and a writable register. The possible selections are originate line interfaces 1 to 6, the test line and an off position. The Secondary Processor selects the line to send on by writing to this register.

5. DTMF Receiver

This is standard DTMF receiver capable of receiving all 16 possible digits and a readable register. The receiver will respond to signal levels of 0 to −24 DBM. The receiver's input is taken from DTMF Receive Selector. The normal use of this Receiver will be to receive a digit to identify the terminating line (PVT). The Secondary processor determines the received digit by reading the register.

6 DTMF Receive Selector

This is a 1 of 8 input selector and a writable register. Possible selections are originate line interfaces 1 to 6, the test line and an off position. The Secondary Processor selects the line to receive on by writing to the register.

7. Tip/Ring Line Interface 6

This is the actual interface to the telephone line. There is an analog input from the A and B DTMF send line selectors and an analog signal output to the DTMF receive line selector. Two digital outputs originate here, one from the Quiet Line detector and the other from the Progress Tone detector. One digital input is provided to operate the line seizure portion. There are 6 of these Tip/Ring Line Interfaces per board - one for each line 1-6.

8. Seize Register

This is a writable register which the Secondary processor writes to in order to seize any or all of the 6 originate lines. The 6 outputs of this register are the digital inputs to the 6 Tip/ring Line Interfaces. This Seize Register is also used to pulse dial on these six lines.

9. Progress Tone Register

This is a readable register which the Secondary processor reads to determine when a progress tone is present. The actual tone present is determined by the cadence of the tone. The input of this register is the digital output of 6 Progress Tone Detectors in the Tip/Ring Line Interface.

10. Quiet Line Register

This is a readable register which the Secondary Processor reads to determine when the 6 originate lines are quiet. The input to this register is the digital output of 6 quiet detectors in the Tip/Ring Line Interfaces.

Figure 18:
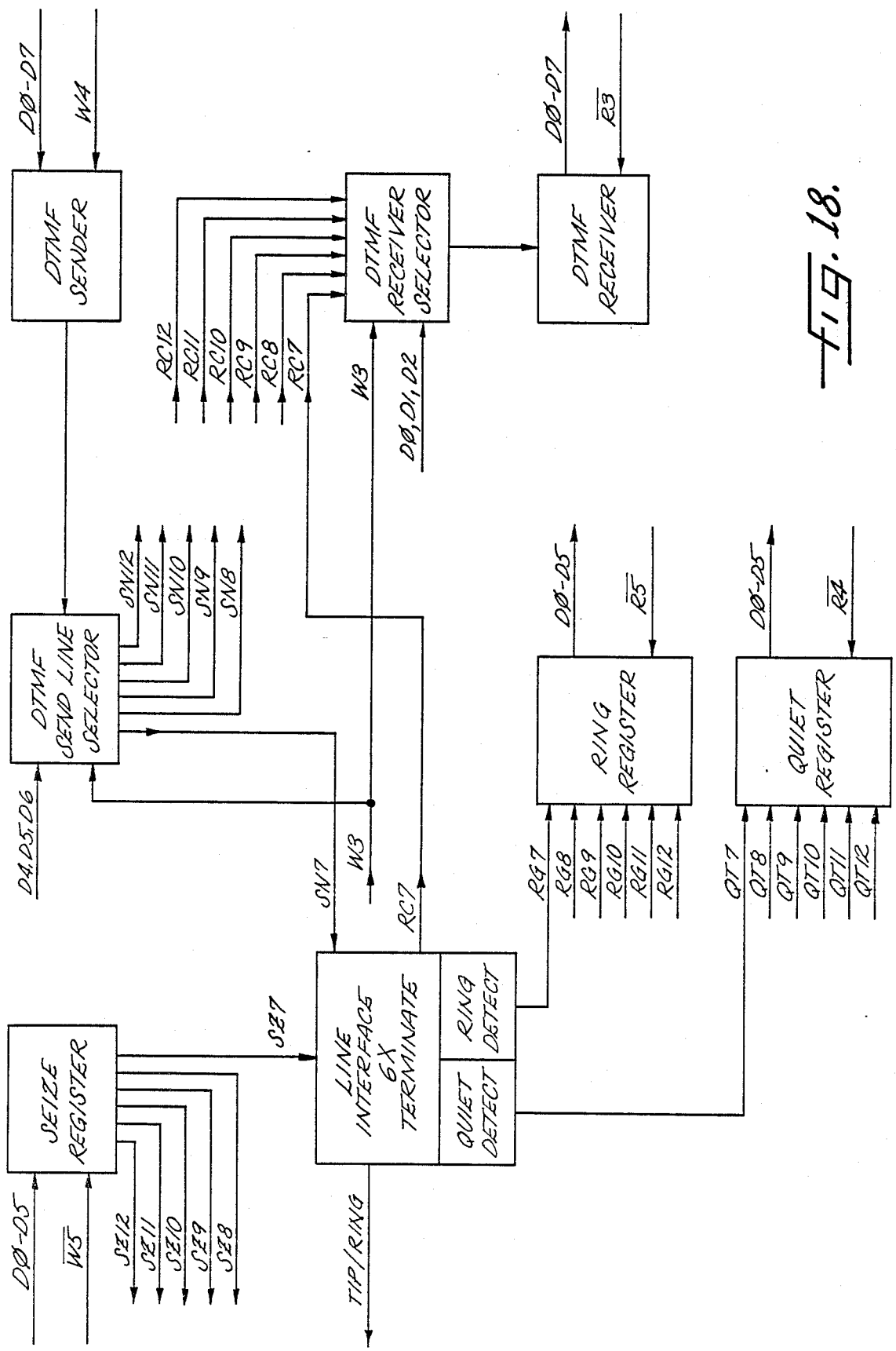
FIG. 18 is a block diagram showing the line interfaces for the terminating lines.

6 Terminate Lines (FIG. 18)

1. DTMF Sender

This is a standard DTMF sender capable of all 16 valid DTMF digits and a writable register; nominal sned level −15 DBM per frequency. Normal use of this sender will be to send forward a digit to identify this line (PVT). Output is fed into the DTMF Send Line Selector. The digit sent is selected by the Secondary Processor writing to this register.

2. DTMF Send Line Selector

This is a 1 of 8 output selector and a writable register. The possible selections are originate line interfaces 1 to 6, the test line and an off position. The Secondary Processor selects the line to send on by writing to this register.

3, DTMF Receiver

This is a standard DTMF receiver capable of receiving all 16 possible digits and a readable register. The receiver will respond to signal levels of 0 to −24 DBM. The receiver's input is taken from the DTMF Receiver Selector. The normal use of this Receiver will be to receive a digit to identify the originating line (PVT). The Secondary Processor determines the received digit by reading the register.

4. DTMF Receive Selector

This is a 1 of 8 input selector and a writable register. Possible selections are originate line interfaces 1 to 6, the test line and an off position. The Secondary Processor selects the line to receive on by writing to the register.

5. Tip/Ring Line Interface 6

This is the actual interface to the telephone line. There is an analog signal input from DTMF send line selector and an analog signal output to the DTMF receive line selector. Two digital outputs originate here; one from the Quiet Line detector and the other from the Ringing detector. One digital input is provided to operate the line seizure portion. There are 6 of these Tip/Ring Line Interfaces per board—one for each line 7–12.

6. Seize Register

This is a writable register, which the Secondary processor writes to in order to trip ring and close the loop on any or all of the 6 terminate lines. The 6 outputs of this register are the digital inputs to the Tip/Ring Line Interfaces.

7. Ringing Register

This is a readable register which the Secondary processor reads to determine when a terminte line is ringing. The input to this register is the digital output of 6 Ringing Detectors in the Tip/Ring Line Interfaces.

8. Quiet Line Register

This is a readable register which the Secondary Processor reads to determine when the 6 terminate lines are quiet. The input to this register is the digital output of 6 quiet detectors in the Tip/Ring Line Interfaces.

ASSEMBLY

FIG. 1 is a view of the Traffic Generator Analog with cards installed. The eight Line Interface circuit boards (1), part number 50311, are installed in the left hand side of the TGA as viewed from the front. The four Secondary Processor board (2), part number 50310, are installed in the right hand side of the TGA in card slots 3, 4, 5, and 6. The RAM/ROM board (3), part number 50300 is installed in card slot number two (2nd card from right). The Primary Processor board (4), part number 50300, is installed in card slot number one (extreme right hand side of TGA). All cards are bolted to the TGA framework and are interconnected with each other via flat ribbon connector cables.

FIG. 16 is a detailed layout of parts on the RAM/ROM printed circuit board. Refer to the "Parts List" in the microfiche appendix of this document for the listing of all parts and their location on the printed circuit board (Units of Product #50312 REVO External RAM/ROM board). All parts are placed on the board and passed through the wave solder machine. The complete board is mounted in card position number 2 of the TGA. (Also see FIGS. 13, 14, 15).

FIG. 19 is a layout of the soft touch keypad which is used to enter commands and programming into the TGA.

| Preliminary Tip/Ring Specification nominal measurements | | |
|---|---|---|
| Progress Tone Detection | 0 to −30 dbm | 40 ms on |
| Rejection | <= −40 dbm | 20 ms on |
| DTMF send level | | |
| −15 dbm per frequency | | |
| DTMF receiver response | | |
| 0 to −24 dbm | 40 ms on | |
| Ringing Detection | | |
| >= 45 volts rms | 14–70 hertz | |
| Quiet Line Detection | | |
| <= −4 dbm | | |
| Ac Impedance | | |
| 900 ohms | | |
| Dc Impedance | | |
| 1800 ohms | line seized | |

The following pages provide information on the addresses of the various memory locations/registers in the TGA. These addresses are used by the programmers to effect particular portions of the calling generation program, i.e. the programmer must known which address to call in his program for the execution of particular task.

Following the decode maps in a block layout of the Software Architecture and hardware needed to support the programs. (See microfiche appendix for information on programming the TGA such as the assign label ID is command 10, a line to go off hook is command 30, report the off hook attempt is command 37, etc.). Using the commands, the end user can program his calling programs very easy. All the hard programming has become part of the systems programming and is burned in the system EPROM.

The Originate Line tables are built by entering the Command 31. Upon entering this command, the LCD displays the first line of the Originate line table. Instead of a "D" in the left of the line a "P" will be displayed to indicate the TGA is in program mode. The cursor will be sitting under the first __. The user enters a two digit line number (i.e. 01) and the cursor moves to the next __(status). The user enters a 1 if the line is to be active and the cursor moves to OP $_{13}$. The user enters outpulse type desired (i.e. 0 for DTMF). The cursor moves to PRGNUM $_{13}$ where we enter one of twenty programs we want to use. The cursor will then move to the next line CALLED NUMBER $_{13}$ where we can enter a 32 digit number to be dialed. The user repeats this sequence for all other originate lines to be used.

Command 32 provides the user access to the Terminate Line Tables where the main function is to enter the program number desired on each terminate lines.

Command 33 provides the user access to the Dial Pulse Parameter table so the user can vary the percent make-break as well as the interdigital timing period. Also shown are the DTMF and MF parameter tables which are accessed by commands 34 and 35 respectively.

Command 10 provides the user access to the Originate Failure Analysis table which provides the user a display of the attempts and failures of all test calls.

| Traffic Generator Analog Primary Processor (FIG. 3, 4, 5) Major Area Decode Map | | | |
|---|---|---|---|
| Area | Address | Unique Addresses | |
| Prom | 000000-0FFFFF | 000000-01FFFF | 128K byte EPROM |
| | | 020000-023FFF | 32K byte EEPROM |

| | | -continued | | |
|---|---|---|---|---|
| Duarts | 100000–1FFFFF | 100000–10001F | 16 byte | Duart1 |
| | | 100020–10003F | 16 byte | Duart2 |
| Slave Com. | 200000–3FFFFF | 200000–20000F | 8 byte | |
| RAM | 400000–7FFFFF | 400000–47FFFF | 512K byte | |
| I/O | 800000–FFFFFF | 800000–800003 | 2 byte | |

Note after the end of the unique address space the decoding will wrap to the start of the same area ie 000004 are the same physical address. And all addresses will decode to some where.

Note Prom area EPROM will decode the first 128K then EEPROM will decode the next 128K. The EEPROM is only 32K so it will decode to the same address 4 times ie. 020010 = 024010.

Decode Map of Primary Processor (FIG. 3, 4, 5)
Secondary Communications and I/O Registers

| Address | Function |
|---|---|
| Read Registers | |
| 200001 | Secondary #1 Receive Register |
| 200003 | Secondary #2 Receive Register |
| 200005 | Secondary #3 Receive Register |
| 200007 | Secondary #4 Receive Register |
| 200009 | Secondary #5 Receive Register |
| 20000B | Secondary Communication Tx Full Register |
| 20000D | Secondary Communication Rx Ready Register |
| 20000F | Not Used |
| 800001 | LCD Busy Register |
| 800003 | Keyboard Input Register |

Note reading upper data is undefined.

| | |
|---|---|
| Write Registers | |
| 200001 | Secondary #1 Transmit Register |
| 200003 | Secondary #2 Transmit Register |
| 200005 | Secondary #3 Transmit Register |
| 200007 | Secondary #4 Transmit Register |
| 200009 | Secondary #5 Transmit Register |
| 20000B | Not Used |
| 20000D | Not Used |
| 20000F | Secondary Reset Register |
| 800001 | LCD Command Register |
| 800003 | LCD Data Register |

Note writing to upper data areas is undefined.

Master Processor (FIG. 3, 4, 5)
Definitions of Hardware Registers

Read Registers

Slave Receive Register

When the Slave transmittes a character to the master it will be read by the master here. Reading the register will not clear the register but it will condition the flag for that slave in the Rx ready register.

Slave Communication Tx Full Register
d0 high = slave #1 Transmit buffer full
d1–d4 = slave 2–5

LCD Busy Register d7 = busy 1 flag
d6 = busy 2 flag
A 1 in d6 or d7 indicates the LCD is busy and should not be written to.

Keyboard Input Register
d5 = keypressed

| key | d4 | d3 | d2 | d1 | d0 |
|---|---|---|---|---|---|
| Ins | 0 | 0 | 0 | 0 | 0 |
| Del | 0 | 0 | 0 | 0 | 1 |
| AscII | 0 | 0 | 0 | 1 | 0 |
| Step | 0 | 0 | 0 | 1 | 1 |
| 0 | 0 | 1 | 0 | 1 | 1 |
| 1 | 0 | 0 | 1 | 0 | 0 |
| 2 | 0 | 1 | 0 | 0 | 0 |
| 3 | 0 | 1 | 1 | 0 | 0 |
| 4 | 0 | 0 | 1 | 0 | 1 |
| 5 | 0 | 1 | 0 | 0 | 1 |
| 6 | 0 | 1 | 1 | 0 | 1 |
| 7 | 0 | 0 | 1 | 1 | 0 |
| 8 | 0 | 1 | 0 | 1 | 0 |
| 9 | 0 | 1 | 1 | 1 | 0 |
| < | 0 | 0 | 1 | 1 | 1 |
| > | 0 | 1 | 1 | 1 | 1 |
| up | 1 | 0 | 0 | 0 | 0 |
| down | 1 | 0 | 0 | 0 | 1 |
| Ent | 1 | 0 | 0 | 1 | 0 |
| Exit | 1 | 0 | 0 | 1 | 1 |

Note: reading this register does not clear it d5 must go low before the next digit is valid.

-continued

Write Registers

Slave Transmit Register

The Master transmits a character to the slave by writing to this register. Writing this register will condition the flag for that slave in the Tx full register. Writing to this register when the buffer is full will over write the previous character.

Slave Reset Register d0 = Slave #1
 d1-d4 = Slave #2-5
 Setting any or all of these bits to 0 for 10 ms will cause a hardware reset of the selected slave processor on the return to a logical 1. These bits should be set high unless a reset is desired.

LCD Command Register

This register is used to pass commands to the LCD display. Before writing the busy flag must be checked to prevent unpredictable results.

| Command | Value Hex |
|---|---|
| System reset | 10 |
| Clear Display data | 01 |
| Cursor at Home | 02 |
| Cursor return | 03 |
| Cursor direction forward | 04 |
| Cursor direction reverse | 05 |
| Cursor right | 06 |
| Cursor left | 07 |
| Cursor Font Underline | 08 |
| Cursor font 5 × 7 blinking | 09 |
| Underline blinking on | 0A |
| Underline blinking off | 0B |
| Cursor ON | 0C |
| Cursor OFF | 0D |
| Display ON | 0E |
| Display OFF | 0F |
| Display Suppress ON | 60 |
| Display Suppress OFF | 20 |
| Set Cursor Address | 80 + 40(line #) + position |
|  line # = 0 or 1 | |
|  position = 0 to 27 hex | |
|  home = 80 hex | |
|  bottom right = E7 | |

LCD Data Register

Writing this register will write characters on the LCD display. The busy flags should be checked prior to any writes to this register. Valid characters are 20-7F and A0-DF hex.

<div align="center">Master Processor (FIG. 3, 4, 5)<br>Duart General Operation</div>

Duart #1

Channel "A"

Channel A is connected to the terminal port. Outputs op4 and op6 are connected to Interrupt level 5. There are no handshake lines on this port.

Channel "B"

Channel B is connected to the printer port. Outputs op5 and op7 are connected to Interrupt level 4. Handshaking is done with output op1. This is request to send to the printer. Output op1 is active low. Input op1 is clear to send from the printer. Input ip1 is active low.

General

"op2" is connect to the modem self test. It is active high.
 "op3" is connect to Interrupt level 6. This is the counter timer output.
 All interrupts are via 6800 autovectors.
 The terminal port and printer port are configured as dce equipment.

Duart #2

Channel "A"

Channel A is connected to the Chaining port. Outputs op4 and op6 are connected to Interrupt level 3. Handshaking is done with output op0. This is request to send. Output op0 is active low. Input ip0 is clear to send from printer. Input ip0 is active low.

Channel "B"

Channel B is connected to the modem port. Outputs op5 and op7 are connected to Interrupt level 2. Handshaking is done with output op1 and op2. Op1 is request to send to the modem. Output op1 is active low. Op2 is dtr to the modem -continued op2 is active high. Input ip1 is clear to send from the
modem. Input ip1 is active low. Ip2 is carrier detect from
the modem. Ip2 is active high.

General

"op3" is connect to the Slave processors as their counter
timer interrupt.
Either Duart may interrupt with the normal interrupt line.
This will cause a level 1 interrupt.
All interrupts are via 6800 autovetors.
The chaining port is configured as dte equipment.
For more information on Duart programming refer to 68681
operation and programming specifications.

Secondary Processor (FIG. 6, 7, 8)
Major Area Decode Map

| Area | Address | Unique Addresses | |
|---|---|---|---|
| Prom | 000000-0FFFFF | 000000-003FFF | 4K byte |
| Ram | 100000-7FFFFF | 100000-11FFFF | 128K byte |
| Hardware | 800000-FFFFFF | 800000-80001F | 16 byte |

Note: After the end of the unique address space the decoding
will wrap to the start of the same area ie 000004 and 004004 are
the same physical address. And all addresses will decode to some
where.

Secondary Processor (FIG. 6, 7, 8)
Decode Map of Hardware Registers

| Address | Function | Chip Select |
|---|---|---|
| READ registers | | |
| 800001 | DTMF Receiver register interface 1 lines 1-6 | R01 |
| 800003 | Quiet Line register interface 1 lines 1-6 | R11 |
| 800005 | Progess tone reg. interface 1 lines 1-6 | R21 |
| 800007 | DTMF Receiver register interface 1 lines 7-12 | R31 |
| 800009 | Quiet Line register interface 1 lines 7-12 | R41 |
| 80000B | Ring detect reg. interface 1 lines 7-12 | R51 |
| 80000D | Not Used | R61 |
| 80000F | Interprocessor Receive Character register | Reg2 |
| 800011 | DTMF Receiver register interface 2 lines 1-6 | R02 |
| 800013 | Quiet Line register interface 2 lines 1-6 | R12 |
| 800015 | Progess tone reg. interface 2 lines 1-6 | R22 |
| 800017 | DTMF Receiver register interface 2 lines 7-12 | R32 |
| 800019 | Quiet Line register interface 2 lines 7-12 | R42 |
| 80001B | Ring detect reg. interface 2 lines 7-12 | R52 |
| 80001D | Not Used | R62 |
| 80001F | Interprocessor Communications Status Register | Reg3 |

Notes: The Secondary Processor is connected to two line
interfaces, each of which has 12 lines. Lines 1-6 are
Originate. Lines 7-12 are terminate.

| Write Registers | | |
|---|---|---|
| 800001 | Send/Rec Selector register interface1 lines 1-6 | W01 |
| 800003 | DTMF Sender register interface 1 lines 1-6 | W11 |
| 800005 | Seize line register interface 1 lines 1-6 | W21 |
| 800007 | Send/Rec selector register interface1 lines 7-1 | W31 |
| 800009 | DTMF Sender register interface 1 lines 7-12 | W41 |
| 80000B | Seize line register interface 1 lines 7-12 | W51 |
| 80000D | "A" DTMF Sender register interface 1 lines 1-6 | W61 |
| 80000F | Interprocessor Send Character register | Reg1 |
| 800011 | Send/Rec Selector register interface 2 lines 1-6 | W02 |
| 800013 | "B" DTMF Sender register interface 2 lines 1-6 | W12 |
| 800015 | Seize Line register interface 2 lines 1-6 | W22 |
| 800017 | Send/Rec Selector register interface 2 lines 7-12 | W32 |
| 800019 | DTMF Sender register interface 2 lines 7-12 | W42 |
| 80001B | Seize Line register interface 2 lines 7-12 | W52 |
| 80001D | "A" DTMF Sender register interface 2 lines 1-6 | W62 |
| 80001F | "A" DTMF Sender Selector reg. interface 1,2 lines 1-6 | W7 |

Notes: The Secondary Processor is connected to two line
interfaces, each of which has 12 lines. Lines 1-6 are
Originate. Lines 7-12 are terminate.

Secondary Processor (FIG. 6, 7, 8)
Definitions of Readable Registers

DTMF Receiver register
d0-d3 = received data

| Digit | d3 | d2 | d1 | d0 |
|---|---|---|---|---|
| 1 | 0 | 0 | 0 | 1 |
| 2 | 0 | 0 | 1 | 0 |
| 3 | 0 | 0 | 1 | 1 |

|   |   |   |   |   |
|---|---|---|---|---|
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 1 | 0 | 1 | 0 |
| * | 1 | 0 | 1 | 1 |
| # | 1 | 1 | 0 | 0 |
| A | 1 | 1 | 0 | 1 |
| B | 1 | 1 | 1 | 0 |
| C | 1 | 1 | 1 | 1 |
| D | 0 | 0 | 0 | 0 |

D4 = Button down
D5 = Strobe
Data is valid when Button down and Strobe are true. Data is not cleared by reading this part. Button down and Strobe must both go false before the next digit is valid.

Quiet Line Register
    d0 = line 1
    d1 = d5 = lines 2-6
    Line is quiet if bit is high.

Progress tone register
    d0 = line 1
    d1-d5 = lines 2-6
    A bit high indicates the presence of a progress tone.
    The actual tone is determined by cadence of the tone.

| high | low | tone |
|---|---|---|
| Continuous |  | dial tone |
| 0.5 sec | 0.5 sec | Line Busy Tone |
| 0.25 sec | 0.25 sec | Reorder Tone |
| 2 sec | 4 sec | Audible Ringing |

Ring detect Register
    d0 = line 1
    d1-d5 = lines 2-6
    A high bit indicates that line is Ringing.

Interprocessor Communications Status register
    d0 high = transmit buffer full
    d1 high = receive character ready Interprocessor Receive Character register
    d0-d7 = Character sent from the Master processor
    reading this register will not clear the register but it will
    condition the Status register flags Ring detect Register
    d0 = line 1
    d1-d5 = lines 2-6
    A high bit indicates that line is Ringing.

Interprocessor Communications Status register
    d0 high = transmit buffer full
    d1 high = receive character ready Interprocessor Receive Character register
    d0-d7 = Character sent from the Master processor
    reading this register will not clear the register but it will
    condition the Status register flags Secondary Processor (FIGS. 6, 7, 8)
                    Writable Register Definitions Send/Rec Line Selector register
    d0-d2 Line selection for DTMF Receiver
    d4-d6 Line selection for DTMF Sender (originate lines "B" Sender)

| data | | | selected |
|---|---|---|---|
| d2 | d1 | d0 | line |
| 0 | 0 | 0 | off |
| 0 | 0 | 1 | Line 1 |
| 0 | 1 | 0 | Line 2 |
| 0 | 1 | 1 | Line 3 |
| 1 | 0 | 0 | Line 4 |
| 1 | 0 | 1 | Line 5 |
| 1 | 1 | 0 | Line 6 |
| 1 | 1 | 1 | Test |

Test line is common to all sender and receiver on the same interface board.

DTMF Sender register
    d0-d7 = DTMF tone to send
    d0-d3 = high group frequencies
    d4-d7 = low group frequencies
        d0 = 1209 hz
        d1 = 1336 hz
        d2 = 1477 hz -continued

```
d3 = 1633 hz
d4 = 697 hz
d5 = 770 hz
d6 = 852 hz
d7 = 941 hz
```

| DTMF digit | d7 | d6 | d5 | d4 | d3 | d2 | d1 | d0 |
|---|---|---|---|---|---|---|---|---|
| 1 | 1 | 1 | 1 | 0 | 1 | 1 | 1 | 0 |
| 2 | 1 | 1 | 1 | 0 | 1 | 1 | 0 | 1 |
| 3 | 1 | 1 | 1 | 0 | 1 | 0 | 1 | 1 |
| 4 | 1 | 1 | 0 | 1 | 1 | 1 | 1 | 0 |
| 5 | 1 | 1 | 0 | 1 | 1 | 1 | 0 | 1 |
| 6 | 1 | 1 | 0 | 1 | 1 | 0 | 1 | 1 |
| 7 | 1 | 0 | 1 | 1 | 1 | 1 | 1 | 0 |
| 8 | 1 | 0 | 1 | 1 | 1 | 1 | 0 | 1 |
| 9 | 1 | 0 | 1 | 1 | 1 | 0 | 1 | 1 |
| * | 0 | 1 | 1 | 1 | 1 | 1 | 1 | 0 |
| 0 | 0 | 1 | 1 | 1 | 1 | 1 | 0 | 1 |
| # | 0 | 1 | 1 | 1 | 1 | 0 | 1 | 1 |
| A | 1 | 1 | 1 | 0 | 0 | 1 | 1 | 1 |
| B | 1 | 1 | 0 | 1 | 0 | 1 | 1 | 1 |
| C | 1 | 0 | 1 | 1 | 0 | 1 | 1 | 1 |
| D | 0 | 1 | 1 | 1 | 0 | 1 | 1 | 1 |

| Single tone | Various single tones may be sent as follows. | | | | | | | |
|---|---|---|---|---|---|---|---|---|
| | d7 | d6 | d5 | d4 | d3 | d2 | d1 | d0 |
| 1209 hz | 1 | 1 | 0 | 0 | 1 | 1 | 1 | 0 |
| 1336 hz | 1 | 1 | 0 | 0 | 1 | 1 | 0 | 1 |
| 1477 hz | 1 | 1 | 0 | 0 | 1 | 0 | 1 | 1 |
| 1633 hz | 1 | 1 | 0 | 0 | 0 | 1 | 1 | 1 |
| 697 hz | 1 | 1 | 1 | 0 | 1 | 1 | 0 | 0 |
| 770 hz | 1 | 1 | 0 | 1 | 1 | 1 | 0 | 0 |
| 852 hz | 1 | 0 | 1 | 1 | 1 | 1 | 0 | 0 |
| 941 hz | 0 | 1 | 1 | 1 | 1 | 1 | 0 | 0 |

Seize Line register
```
d0 = line 1
d1-d5 = line 2-6
Setting any of these bits high will cause the associated
line to seize.
```
Interprocessor Send Character register
```
d0-d7
Writing this register will make that character available to
the master processor and condition the status register flags.
Writing this register will over write any character that has
not been read by the master processor.
```
"A" DTMF Sender Selector reg.
```
d0-d2 = Line selection for "A" DTMF Sender Interface 1 lines
1-6
d4-d6 = Line selection for "A" DTMF Sender Interface 2 lines
1-6
```

Thus, the TGA helps to detect a number of different kinds of telecommunications problems in a switch long before such problems could cause an unnecessary telephone outage for its customers. These software and hardware problems, which have gone unrecognized during installation and repair in the past, are now examined for in the tone test in both call switching directions, the quiet test in both call switching directions, and the simultaneous analysis of a large number of calls per hour by the distributed processing arrangement in the TGA. In the drawings and specification, there have been set forth preferred embodiments of the invention, and although specific terms are employed, they are used in a generic and descriptive sense only and not for purposes of limitation, the scope of the invention being set forth in the following claims.

THAT WHICH IS CLAIMED IS:

1. The Traffic Generator Analog (TGA) is a call processing monitor system for dynamically verifying the operation of a telephone switching center with a plurality of originating lines each connecting to said switching center and a plurality of terminating lines each connected to said switching center, said call processing system comprising the following elements which are conventional or known:

a micro-processor based call processing monitor system for dynamically verifying the operation of a telephone switching center, and plurality of originating lines each connected to said switching center and plurality of terminating lines each connected to said switching center, said call processing monitor system comprising: means for selecting one of a plurality of said originating lines; dial tone detection means connected to each of said plurality of originating lines and operated to detect application of dial tone by said switching center; second means for selecting digit values representing a telephone directory number operated in response to said operation of said dial tone detection means;

said second selecting means includes fully programmable memory means whereby any telephone directory number is selectable;

said second selecting means further includes dial pulse generating means connected between said second selecting means and one of said plurality of said originating lines for transmitting a series of pulses representing each of said digits of said telephone directory number;

means for transmitting said digit values connected to said second selecting means; means for sequencing said digit values for transmission connected to said transmission means; ring detection means connected to said terminating line and operated to detect a complete path from said originating line to said terminating line through said switching center; said ring detection means includes a plurality of ring detection circuits, each circuit connected to a particular terminating line;

answer means connected to said ring detection means and operated in response to said operation of said ring detection means to produce a signal representing an off-hook condition;

test tone generation means connected to said answer means and operated in response to said off-hook condition to produce a test tone of a particular frequency;

delay means connected to said answer means and operated in response to said off-hood condition to connect said generated test tone to said terminating line;

test tone detection means connected to said originating line for detection of said complete path through such switching center;

Wherein the improvement comprises:

an EPROM and an EEPROM memory means are provided so that programs are stored in EPROM and variable calling parameters are stored in EEPROM;

that upon the detection of test tone from a terminating line by an originating line, the originating line sends a test tone back to the terminating line; and a test tone detection means is connected to said terminating line for detection of a complete path through such switching center.

2. A call processing monitor system as claimed in claim 1 wherein: a quiet test detection means is connected to said terminting line for detection of noise on said complete path through such switching center.

3. A call processing monitor system as claimed in claim 1 wherein: a delay means is connected to a ring detection means which provides a signal for a path verification test and is operated in response to a completed path verification to connect said quiet test detection means to said terminting line.

4. A call processing monitor system as claimed in claim 1 wherein: a quiet test detection means is connected to said originating line for detection of noise on said complete path through such switching center.

5. A call processing monitor system as claimed in claim 1 wherein: a delay means is connected to a ring detection means which provides a signal for a path verification test and is operated in response to a completed path verification to connect said quiet test detection means to said originating line.

6. A call processing monitor system as claimed in claim 1 wherein: the operating program and an internal 300 baud modem provides the ability for remotely programming the variable calling parameters via a dial up connection to the internal modem.

7. A call processing monitor system as claimed in claim 1 wherein: there is further included: an internal keypad and forty character Liquid Crystal Display (LCD) to allow a user to program the TGA without the need for an external CRT and allows for review of progams and data without the need for a printer.

8. A call processing monitor system as claimed in claim 1 wherein: operation measurements are stored in a RAM memory for originate attempts, originate completes, dial tone failure, path verification failure O-T, quiet test failure O-T, ringback tone failure, ringing generator failure, terminating attempts, terminating failures, path verification failure T-O, and quiet test failure T-O.

9. A call processing monitor system as claimed in claim 7 wherein: the operating program and connections via RS-232 jacks allow an external CRT and/or printer to be used in lieu of the internal keypad and/or LCD.

10. A call processing monitor system as claimed in claim 1 wherein: the operating program and connections via RS-232 jacks allow twenty units (960 originate and 960 terminate lines) to be chained together and controlled by one Master Unit.

11. A call processing monitor system as claimed in claim 1 wherein: means are provided so that the operating program and variable calling parameters allow for stop on fault on a per line basis.

12. A call processing monitor system as claimed in claim 1 wherein: the programmable flexibility of said second select means allows called telephone numbers to be up to thirty-two digits, a mixture within the same digit string of dial pulse and DTMF in any combination, and ability to monitor for dial tone after each and every digit if so desired.

13. A call processing monitor system as claimed in claim 1 wherein: a plurality of printed circuit boards assembled into a Traffic Generator Analog unit are interconnected by ribbon cables rather than backplanes thereby preventing a loose connection problem associated with backplanes when subjected to rough physical handling.

14. A micro-processor based call processing monitor system for dinamically verifying the operation of a telephone switching center, and plurality of originating lines each connected to said switching center and plurality of terminating lines each connected to said switching center, said call processing monitor system comprising:

means for selecting one of a plurality of said originating lines;

dial tone detection means connected to each of said plurality of originating lines and operated to detect application of dial tone on the originating line by said switching center;

second means for selecting and dialing a telephone directory number in response to said operation of said dial tone detection means;

ring detection means connected to said terminating line and operated to detect a complete path from said originating line to said terminating line through said switching center, said ring detection means including a plurality of ring detection circuits, each circuit connected to a particular terminating line;

answer means connected to said ring detection means and operated in response to said operation of said ring detection means to produce a signal representing an off-hook condition;

test tone generation means connected to said answer means and operated in response to said off-hook condition to produce a test tone of a particular frequency;

delay means connected to said answer means and operated in response to said off-hook condition to connect said generated test tone to said terminating line and to said originating line; and test tone detection means connected to said originating line and to said terminating line and operable for detection of said complete path through said switching center.

15. A call processing monitor system for dynamically verifying the operation of a telephone switching center having a plurality of originating lines and a plurality of terminating lines, said monitor system comprising:

means for selecting one of a plurality of said originating lines;

dial tone detection means connected to each of said plurality of originating lines for detecting the application of dial tone on the selected originating line by said switching center;

dialing means for dialing a telephone directory number digit string on the selected originating line in response to the detection of the dial tone by said dial tone detection menas;

ring detection means connected to each of said plurality of terminating lines for detecting a complete path from said originating line to a terminating line through said switching center;

answer means connected to said ring detection means and operated in response to the operation of said ring detection means for producing a signal on said terminating line representing an off-hook condition;

test tone generation means for producing a test tone of a particular frequency;

test tone connection means operated during said off-hook condition for connecting said test tone generation means to said terminating line and to said originating line; and test tone detection means connected to said originating line and to said terminating line and operable in response to the connection of the test tone by said test tone connection means for detecting the test tone in each direction thorugh said switching center.

16. The call processing monitor system according to claim 15 wherein said test tone connection means includes means for first connecting the test tone to said terminating line, and including means responsive to detection at said originating line by said test tone detection means of the test tone applied at said terminating line for next connecting the test tone to said originating line to permit detection of a complete path in each direction through the switching center.

17. The call processing monitor system according to claim 15 wherein said test tone generation means includes a means for generating test tones of a plurality of different frequencies.

18. The call processing monitor system according to claim 15 wherein said monitor system includes a quiet test means connected to said originating line and to said terminating line for detecting noise above a predetermined level in each direction through said switching center.

19. The call processing monitor system according to claim 18 wherein said quiet test means includes a means for first connecting said quiet test means to said terminating line in response to the operation of said answer means and while said test tone connection means is inoperative, and including means for next connecting said quiet test means to said originating line, wherein noise above a predetermined level is detected in each direction through said switching center.

20. The call processing monitor system according to claim 15 wherein said means for selecting one of a plurality of said originating lines includes simultaneous selection means operable for simultaneously selecting a plurality of originating lines and terminating lines.

21. The call processing monitor system according to claim 15 wherein said monitor system includes a distributed processing means having a primary processor and a plurality of secondary processors connected to said primary processor and operable for simultaneously analyzing a plurality of selected pairs of originating and terminating lines through said switching center.

22. The call processing monitor system according to claim 15 wherein said monitor system includes a chaining means for allowing a plurality of said monitor systems to be connected together so that an increased number of originating lines and terminating lines can be simultaneously analyzed through said switching center.

23. The call processing monitor system according to claim 15 wherein the dialing means includes a means for generating and transmitting at any time in a digit string either dual tone multi-frequencies (DTMF) or dial pulses (DP) to said selected originating line.

24. The call processing monitor system according to claim 15 wherein said dial tone detection means includes a means for detecting a dial tone on said originating line at any time in the digit string from said dialing means.

25. The call processing monitor system according to claim 15 wherein said monitor system includes a remote modifiable programing means which allows said monitor system to be programmed by the user or through a modem where said switching center is located.

26. A call processing monitor system for dynamically verifying the operation of a telephone switching center having a plurality of originating lines and a plurality of terminating lines, said monitor system comprising:

means for selecting one of a plurality of said originating lines;

dial tone detection means connected to each of said plurality of originating lines for detecting the application of the dial tone on the selected originating line by said switching center when said originating line is in an off-hook condition;

dialing means for dialing a telephone directory number digit string on the selected originating line in response to the detection of the dial tone by said dial tone detection means so that said switching center ends its dial tone and appropriately switches the digit string therethrough;

ringback detection means connected to each of said plurality of originating lines for detecting in response to said digit string a ringback tone on said originating line from said switching center when the dialing is completed and said terminating line is still in an on-hook condition;

ring detection means connected to each of said plurality of terminating lines for detecting in response to said digit string a ringing generator signal on a respective terminating line for determining if there is a complete path from said originating line to a terminating line through said switching center;

answer means connected to said ring detection means and operated in response to the operation of said ring detection means for producing a signal on said terminating line representing an off-hook condition and for detecting the end of the respective ringback tone and ringing generator signal from said switching center;

test tone generation means for producing a test tone of a particular frequency when an off-hook condition is present for both said originating and terminating lines;

test tone connection means operated in response to and off-hook condition on both said originating and terminating lines for connecting said test tone generation means to said terminating line and to said originating line;

test tone detection means connected to said originating line and to said terminating line and operable in response to the connection of the test tone by said test tone connection means for detecting the test tone in each direction through said switching center, said test tone detection means disconnecting said test tone connection means and said test tone generation means when said test tone detection means has completed its operation;

quiet test means for detecting noise above a predetermined level in each direction through said switching center; and quiet test connection means operated in response to the disconnection of said test tone connection means for coupling said quiet test means to said terminating line and to said originating line.

27. The call processing monitor system according to claim 26 wherein said test tone connection means includes means for first connecting the test tone to said terminating line, and including means responsive to detection at said originating line by said test tone detection means of the test tone applied at said terminating line for next connecting the test tone to said originating line to permit detection of a complete path in each direction through the switching center.

28. The call processing monitor system according to claim 26 wherein said test tone generation means includes a means for generating test tones of a plurality of different frequencies.

29. The call processing monitor system according to claim 26 wherein said monitor system includes a hang-up means operated in response to said test tone detection means and said quiet test means completing their function for producing an on-hook condition on said originating line and said terminating line, wherein this selected pair of originating and terminating lines has been analyzed through said switching center.

30. A call processing monitor system for dynamically verifying the operation of a telephone switching center having a plurality of originating lines and a plurality of terminating lines, said monitor system comprising:

a primary processor;

a plurality of independently operable secondary processors connected to said primary processor;

means associated with each of said secondary processors for connecting to a plurality of originating lines and a plurality of terminating lines;

a set of instructions stored in each of said secondary processors defining a sequence of test operations, said instructions comprising:

means for selecting one of a plurality of said originating lines;

dialing means for dialig a telephone directory number digit string on the selected originating line;

ring detection means connected to each of said plurality of terminating lines for detecting a complete path from said originating line to a terminating line through said switching center;

answer means connected to said ring detection means and operated in response to the operation of said ring detection means for producing a signal on said terminating line representing an off-hook condition;

test tone generating means for producing a test tone of a particular frequency;

test tone connection means operated during said off-hook condition for connecting said test tone generation means to said terminating line and to said originating line; and test tone detection means connected to said originating line and to said terminting line and operable in response to the connection of the test tone by said test tone connection means for detecting said test tone in each direction through said switching center.

31. The call processing monitor system according to claim 30 wherein each of said set of instructions also includes monitor system includes a quiet test means connected to said originating and terminating line for detecting noise above a predetermined level through said switching center.

32. The call processing monitor system according to claim 30 wherein said monitor system further includes a memory means, such as EPROM or EEPROM, associated with said primary processor for storing said set of instructions defining the test operations to be performed, and means for downloading the stored set of instructions from said memory means to each of said secondary processors.

33. A method for dinamically verifying the operation of a telephone switching center having a plurality of originating lines and a plurality of terminating lines, comprising:

selecting one of a plurality of originating lines; dialing a telephone directory number digit string on said originating line;

detecting a ringing generator on one of a plurality of terminating lines for determining the complete path from said selected originating line through said switching center to said terminating line;

answering said terminating line for producing an off-hook condition thereupon;

generating a test tone of a particular frequency;

connecting said test tone to said terminating line and to said originating line; and detecting said test tone that is signalled through said switching center on said terminating line and on said originating line for verifying the operation of said switching center.

34. The method according to claim 33 wherein said step of connecting and detecting said test tone furhter includes first connecting said test tone to said terminating line and detecting said test tone on said originating line, and next connecting said test tone to said originating line and detecting said test tone on said terminating line.

35. The method according to claim 33 wherein said step of dynamically verifying the operation of said swtching center includes detecting the noise above a predetermined level on said terminating line and on said originating line when said test tone is not connected thereto.

36. The method according to claim 35 wherein said step of detecting noise further includes first detecting noise above a predetermined level on said terminating line, and next detecting noise above a predetermined level on said originating line.

37. The method for dynamically verifying the operation of a telephone switching center having a plurality of originating lines and a plurality of terminating lines, comprising:

selecting one of a plurality of originating lines;
detecting a dial tone on said selected originating line;
dialing a telephone directory number digit string on said originating line;
detecting a ringback tone on said selected originating line;
detecting a ringing generator on one of a plurality of terminating lines for determining the complete path from said selected originating line through said switching center to said terminating line;
answering said terminating line for producing an off-hook condition thereupon;
generating a test tone of a particular frequency;
first connecting said test tone to said terminating line;
first detecting said test tone on said originating line after it was applied on said terminating line through said switching center;
next connecting said test tone to said originating line;
next detecting said test tone on said terminating line after it was applied on said originating line through said switching center;
first detecting noise above a predetermined level on said terminating line; and
next detecting noise above a predetermined level on said originating line.

38. The method according to claim 37 wherein said steps of detecting noise occurs before said steps of connecting and detecting said test tone.

* * * * *

UNITED STATES PATENT AND TRADEMARK OFFICE
CERTIFICATE OF CORRECTION

PATENT NO. : 4,852,144

DATED : July 25, 1989

INVENTOR(S) : Marion P. Cole

It is certified that error appears in the above-identified patent and that said Letters Patent is hereby corrected as shown below:

IN THE DRAWINGS:

Add the sheet of drawing consisting of Fig. 19, as shown on the attached page.

Column 1, line 52, delete "telecommuniations" and insert --telecommunications--.
Column 2, line 38, delete "rspective" and insert --respective--.
Column 3, line 68, delete "braod" and insert --broad--.
Column 6, line 19, delete "verfied" and insert --verified--.
Column 8, line 38, delete "terminte" and insert --terminate--.
Column 8, line 61, delete "Comunications" and insert --Communications--.
Column 9, line 27, after "17)" insert a return to form a new paragraph.
Column 10, line 8, after "analog" insert --signal--.
Column 10, line 20, delete "Tip/ring" and insert --Tip/Ring--.
Column 10, line 37, before "6" insert --B. --.
Column 10, line 41, delete "sned" and insert --send--.
Column 10, line 52, delete "3," and insert --3.--.
Column 11, line 50, delete "plete" and insert --pleted--.
Column 12, line 22, delete "known" and insert --know--.
Column 12, line 43, after "OP" delete "13" and insert --_--.
Column 12, line 45, after "PRGNUM" delete "13" and insert --_--.
Column 12, line 47, after "NUMBER" delete "$_{13}$" and insert --_--.

Column 23, line 22, delete "off-hood" and insert --off-hook--.
Column 23, line 30, after "that" insert --operating--.
Column 23, line 41, delete "terminting" and insert --terminating--.

UNITED STATES PATENT AND TRADEMARK OFFICE
CERTIFICATE OF CORRECTION

PATENT NO. : 4,852,144

DATED : July 25, 1989

INVENTOR(S) : Marion P. Cole

It is certified that error appears in the above-identified patent and that said Letters Patent is hereby corrected as shown below:

```
    Column 23, line 48, delete "terminting" and insert
--terminating--.
    Column 24, line 40, delete "dinamically" and insert
--dynamically--.
    Column 25, lines 15 and 16 should be indented.
    Column 25, line 24, delete "menas" and insert --means--.
    Column 25, line 32, delete "representating" and insert
--representing--.
    Column 25, line 44, delete "thorugh" and insert --through--.
    Column 28, line 1, delete "dialig" and insert --dialing--.
    Column 28, line 19, delete "terminting" and insert
--terminating--.
    Column 28, line 38, delete "dinamically" and insert
--dynamically--.
    Column 28, line 42, after "lines;" insert a return to form
a new paragraph.
    Column 28, line 59, delete "furhter" and insert --further--.
    Column 28, line 67, delete "swtching" and insert
--switching--.
```

Signed and Sealed this

Twenty-fourth Day of July, 1990

*Attest:*

HARRY F. MANBECK, JR.

*Attesting Officer*     *Commissioner of Patents and Trademarks*

KEYPAD LAYOUT

| TEST PROGRAM ENTRY | 1 | 2 | 3 | STEP TO NEXT LINE |
|---|---|---|---|---|
| ASCII CHARACTER | 4 | 5 | 6 | STEP TO PREVIOUS LINE |
| DELETE CHARACTER | 7 | 8 | 9 | ENTER |
| SINGLE STEP | ✳ CURSOR LEFT | 0 | # CURSOR RIGHT | EXIT |

Fig. 19.